(12) United States Patent
Barry et al.

(10) Patent No.: US 10,691,493 B1
(45) Date of Patent: *Jun. 23, 2020

(54) PROCESSING PLATFORM WITH DISTRIBUTED POLICY DEFINITION, ENFORCEMENT AND MONITORING ACROSS MULTI-LAYER INFRASTRUCTURE

(71) Applicant: EMC IP Holding Company LLC, Hopkinton, MA (US)

(72) Inventors: Patrick Barry, Banteer (IE); Ryan Andersen, Belmont, MA (US); Nitin John, Sudbury, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 178 days.

This patent is subject to a terminal disclaimer.

(21) Appl. No.: 15/885,339

(22) Filed: Jan. 31, 2018

(51) Int. Cl.
| | |
|---|---|
| G06F 9/50 | (2006.01) |
| G06F 11/30 | (2006.01) |
| G06F 9/445 | (2018.01) |
| G06F 11/34 | (2006.01) |

(52) U.S. Cl.
CPC ........ *G06F 9/5011* (2013.01); *G06F 9/44505* (2013.01); *G06F 11/302* (2013.01); *G06F 11/3006* (2013.01); *G06F 11/3466* (2013.01)

(58) Field of Classification Search
CPC ............... G06F 9/5011; G06F 9/44505; G06F 11/3006; G06F 11/302; G06F 11/3466
See application file for complete search history.

(56) References Cited

U.S. PATENT DOCUMENTS

| | | | |
|---|---|---|---|
| 9,304,793 B2 | 4/2016 | Kannan et al. | |
| 9,762,619 B1 * | 9/2017 | Vaidya | G06F 9/455 |
| 2006/0015512 A1 * | 1/2006 | Alon | H04L 47/10 |
| 2012/0011517 A1 * | 1/2012 | Smith | H04L 41/5003 |
| | | | 718/104 |

(Continued)

OTHER PUBLICATIONS

Dell EMC, "VxRack System FLEX Architecture Overview," Dell EMC, Document Revision 1.6, Oct. 2017, 25 pages.

(Continued)

*Primary Examiner* — Meng Ai T An
*Assistant Examiner* — Willy W Huaracha
(74) *Attorney, Agent, or Firm* — Ryan, Mason & Lewis, LLP

(57) ABSTRACT

An apparatus in one embodiment comprises a processing platform configured to implement multi-layer infrastructure comprising compute, storage and network resources at a relatively low level of the multi-layer infrastructure, an application layer at a relatively high level of the multi-layer infrastructure, and one or more additional layers arranged between the relatively high level and the relatively low level. The processing platform is further configured to determine policies for respective different ones of the layers of the multi-layer infrastructure, the policy for a given one of the layers of the multi-layer infrastructure defining rules and requirements relating to that layer, to enforce the policies at the respective layers of the multi-layer infrastructure, and to monitor performance of an application executing in the multi-layer infrastructure. One or more configuration parameters of the multi-layer infrastructure are adjusted based at least in part on a result of the monitoring.

20 Claims, 22 Drawing Sheets

(56) References Cited

U.S. PATENT DOCUMENTS

2013/0254360 A1\* 9/2013 Anderson ............... H04L 67/10
709/223
2017/0142223 A1\* 5/2017 Lee ........................ H04L 67/32

OTHER PUBLICATIONS

Dell EMC, "VxBlock and Vblock Systems 740 Architecture Overview," Dell EMC, Document Revision 1.15, Dec. 2017, 60 pages.

\* cited by examiner

US 10,691,493 B1

PROCESSING PLATFORM WITH DISTRIBUTED POLICY DEFINITION, ENFORCEMENT AND MONITORING ACROSS MULTI-LAYER INFRASTRUCTURE

FIELD

The field relates generally to information processing systems, and more particularly to techniques for policy definition and enforcement in cloud-based data centers and other types of information processing systems.

BACKGROUND

Information processing systems increasingly utilize reconfigurable virtual resources to meet changing user needs in an efficient, flexible and cost-effective manner. For example, data center infrastructure typically comprises compute, storage and network resources which run a mix of application workloads. The infrastructure is managed by an IT operations team that generally works in isolation from an application development team while the utilization requirements of the infrastructure is determined by the application workloads which run on the infrastructure. The application development team has limited knowledge of the infrastructure, while the IT operations team has limited knowledge of the applications. This can create significant issues in the definition and interpretation of the particular infrastructure required to run a given application workload at an optimal quality level. The above-noted disconnect between application development and IT operations can therefore result in sub-optimal workload placement within the data center infrastructure. Accordingly, there is a need for improved techniques for policy-based infrastructure management in information processing systems.

DETAILED DESCRIPTION

Figure 1:
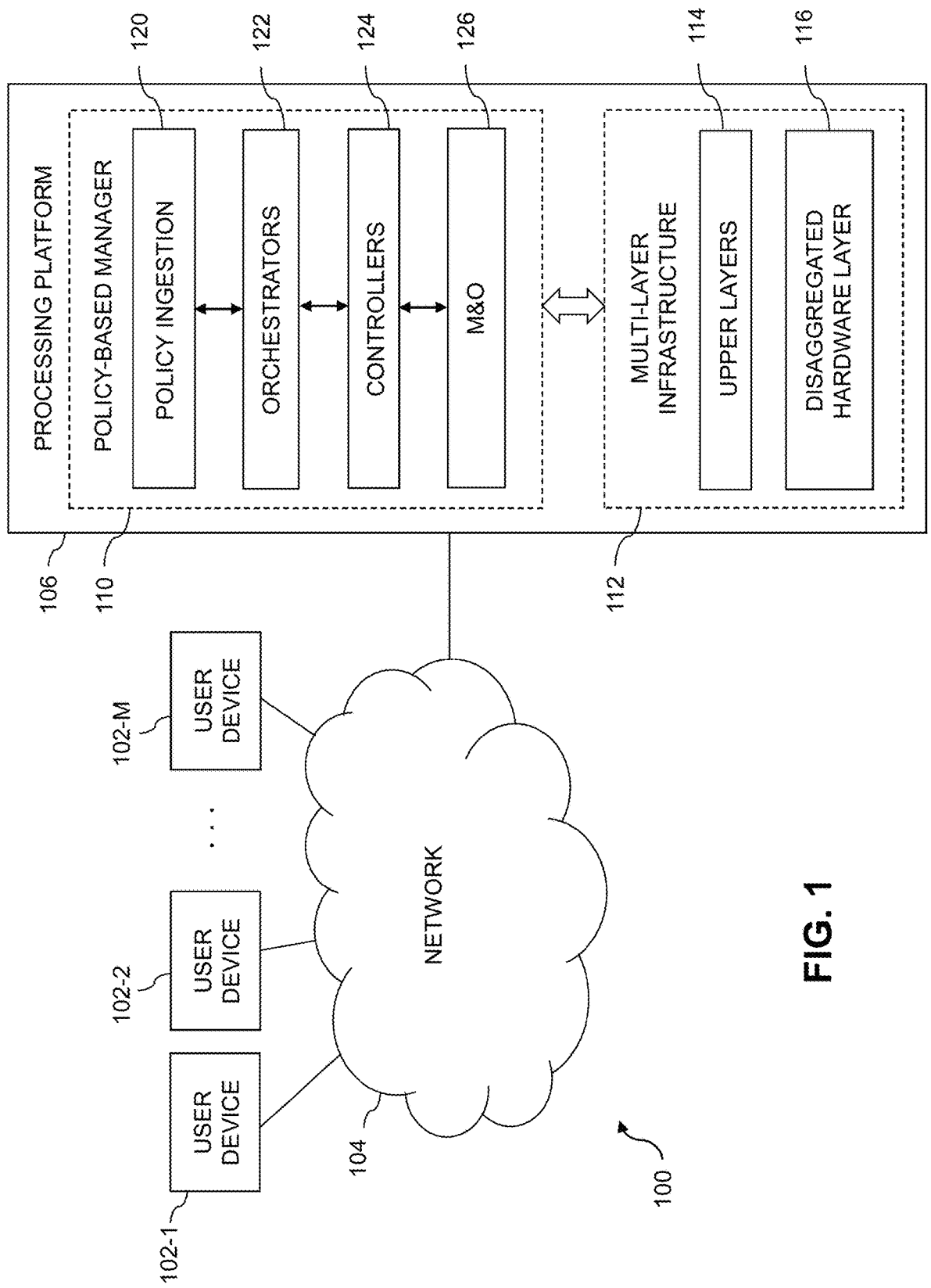
FIG. 1 is a block diagram of an information processing system comprising a processing platform configured with functionality for independent definition and mutual enforcement of operational and application policies in an illustrative embodiment.

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Numerous other system configurations are possible in other embodiments.

An apparatus in one embodiment comprises a processing platform that includes a plurality of processing devices each comprising a processor coupled to a memory. The processing platform is configured to implement multi-layer infrastructure comprising compute, storage and network resources at a relatively low level of the multi-layer infrastructure and a plurality of upper layers overlying the relatively low level. The upper layers overlying the relatively low level comprise at least an application layer at a relatively high level of the multi-layer infrastructure and one or more additional upper layers underlying the application layer. The processing platform is further configured to determine a plurality of operational policies for respective different ones of the layers of the multi-layer infrastructure other than the application layer, the operational policies defining operational rules and requirements relating to the corresponding layers of the multi-layer infrastructure, to determine an application policy for the application layer, the application policy defining application workload rules and requirements for an application to be executed in the multi-layer infrastructure, and to manage the multi-layer infrastructure in accordance with the operational policies and the application policy. The operational policies are defined independently of the application policy but mutually enforced with the application policy in conjunction with execution of the application in the multi-layer infrastructure.

An apparatus in another embodiment comprises a processing platform that includes a plurality of processing devices each comprising a processor coupled to a memory. The processing platform being configured to implement multi-layer infrastructure comprising compute, storage and network resources at a relatively low level of the multi-layer infrastructure, an application layer at a relatively high level of the multi-layer infrastructure, and one or more additional layers arranged between the relatively low level and the relatively high level. The processing platform is further configured to determine policies for respective different ones of the layers of the multi-layer infrastructure, the policy for a given one of the layers defining rules and requirements relating to that layer, to enforce the policies at the respective layers of the multi-layer infrastructure, and to monitor performance of an application executing in the multi-layer infrastructure. One or more configuration parameters of the multi-layer infrastructure are adjusted based at least in part on a result of the monitoring.

These and other illustrative embodiments described herein include, without limitation, methods, apparatus, systems, and computer program products comprising processor-readable storage media.

FIG. 1 shows an information processing system 100 configured in accordance with an illustrative embodiment of the present invention. The information processing system 100 comprises a plurality of user devices 102-1, 102-2, . . . 102-M coupled via a network 104 to a processing platform 106.

The user devices 102 in this embodiment can comprise, for example, desktop, laptop or tablet computers, mobile telephones, or other types of processing devices capable of communicating with the processing platform 106 over the network 104. Users associated with the respective user devices 102 are assumed to run respective sets of applications utilizing corresponding sets of virtual resources of at least one cloud-based system provided by the processing platform 106. For example, such users may be respective tenants of a cloud data center or other type of multi-tenant environment provided by the processing platform 106. These tenants are examples of what are more generally referred to herein as respective "users" of the processing platform 106. Tenants or other users may also be referred to as "customers" of a cloud service provider.

In some embodiments, the virtual resources comprise a plurality of containers allocable to respective applications under the control of the cloud-based system. Additional or alternative virtual resources that may be used in a given embodiment include virtual machines. For example, the virtual resources may comprise a plurality of virtual machines allocable to the applications under the control of the cloud-based system. Various combinations of containers, virtual machines and other virtual resources may be used in other embodiments. For example, virtual resources may comprise containers running in virtual machines.

At least portions of the processing platform 106 in some embodiments may comprise cloud infrastructure of a cloud-based system such as a Pivotal Cloud Foundry system. The term "cloud-based system" as used herein is intended to be broadly construed so as to encompass, for example, a software-defined data center.

The network 104 over which the user devices 102 and the processing platform 106 communicate illustratively comprises one or more networks including, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

The processing platform 106 is assumed to include a plurality of processing devices each having a processor coupled to a memory, and is configured to implement the virtual resources of the cloud-based system for use by applications.

By way of example, the processing platform 106 can be implemented at least in part utilizing converged infrastructure. Such converged infrastructure may comprise at least portions of VxRail™, VxRack™, VxRack™ FLEX, VxBlock™, or Vblock® converged infrastructure from VCE, the Virtual Computing Environment Company, now the Converged Platform and Solutions Division of Dell EMC.

As indicated above, the processing platform 106 in the present embodiment is assumed to implement at least one cloud-based system. Such a cloud-based system is also referred to herein as simply a "cloud."

Examples of different types of clouds that may be utilized in illustrative embodiments include private, public and hybrid clouds. Private clouds illustratively include on-premises clouds and off-premises clouds, where "premises" refers generally to a particular site or other physical location of the business, enterprise, organization or other entity that utilizes the private cloud. Public clouds are assumed to be off-premises clouds. Hybrid clouds comprise combinations of public and private clouds and thus may include various combinations of on-premises and off-premises portions.

The processing platform 106 in the present embodiment is more particularly configured to implement a policy-based manager 110 and multi-layer infrastructure 112. The multi-layer infrastructure 112 in the present embodiment more particularly comprises a plurality of upper layers 114 that overlie a disaggregated hardware layer 116.

The policy-based manager 110 of the processing platform 106 more particularly comprises policy ingestion modules 120, orchestrators 122, controllers 124 and management and orchestration ("M&O") modules 126.

The disaggregated hardware layer 116 in some embodiments comprises compute, storage and network resources. The compute, storage and network resources are associated with one or more host devices. Such host devices are examples of what are more generally referred to herein as "processing devices." The compute, storage and network resources may be viewed as examples of virtual resources of the processing platform 106.

The multi-layer infrastructure 112 thus illustratively comprises compute, storage and network resources at a relatively low level 116 of the multi-layer infrastructure 112 and the plurality of upper layers 114 overlying the relatively low level 116. The upper layers 114 overlying the relatively low level 116 illustratively comprise at least an application layer at a relatively high level of the multi-layer infrastructure 112 and one or more additional upper layers underlying the application layer. More detailed examples of such multi-layer infrastructure will be described below in conjunction with FIGS. 2 and 3.

The policy-based manager 110 of the processing platform 106 is configured to determine a plurality of operational policies for respective different ones of the layers of the multi-layer infrastructure 112 other than the application layer, with the operational policies defining operational rules and requirements relating to the corresponding layers of the multi-layer infrastructure 112.

The policy-based manager 110 of the processing platform 106 is further configured to determine at least one application policy for the application layer, with a given such application policy defining application workload rules and requirements for an application to be executed in the multi-layer infrastructure 112, and to manage the multi-layer infrastructure 112 in accordance with the operational policies and the application policy.

It is to be appreciated that references herein to a single application policy are not intended to be limiting in any way, and that the disclosed techniques are extendable in a straightforward manner to multiple application policies.

The operational policies are illustratively defined by an IT operations team that manages the multi-layer infrastructure 112. However, the application policy is illustratively defined by an application development team that develops the application.

The operational policies in the present embodiment are therefore defined independently of the application policy but mutually enforced with the application policy in conjunction with execution of the application in the multi-layer infrastructure 112 of the processing platform 106.

Such an arrangement advantageously avoids the previously-described issues that can otherwise arise in the definition and interpretation of the particular infrastructure required to run a given application workload at an optimal quality level. Illustrative embodiments therefore provide improved techniques for policy-based infrastructure management that overcome the problems associated with the above-noted conventional disconnect between application development and IT operations. For example, sub-optimal workload placement within data center infrastructure is avoided in illustrative embodiments.

It is to be appreciated that the foregoing advantages and other advantages referred to herein are illustrative of advantages provided in certain embodiments, and need not be present in other embodiments.

Figure 2:
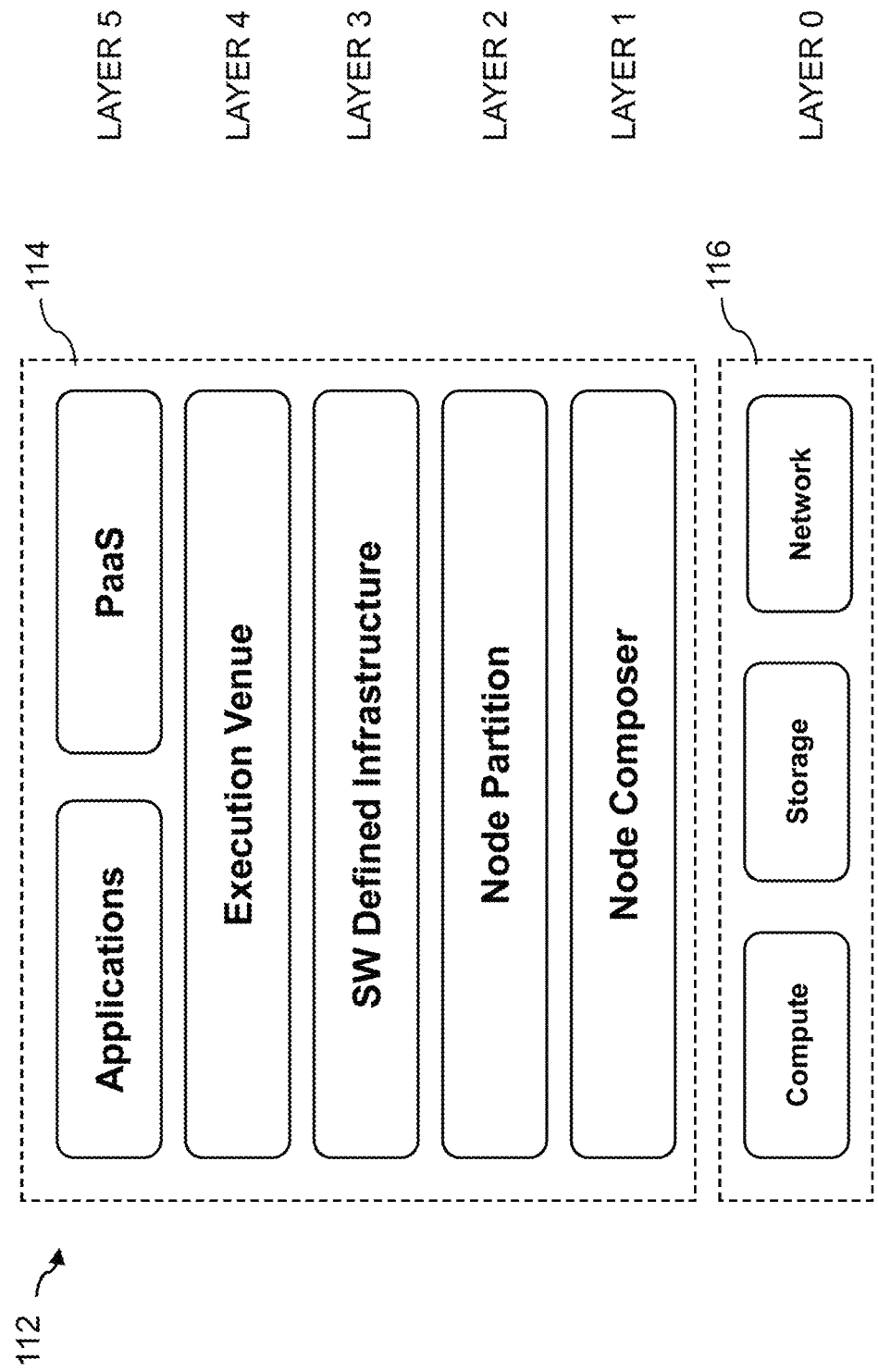
FIG. 2 shows an example of infrastructure abstraction layers of a multi-layer infrastructure in an illustrative embodiment.

Referring now to FIG. 2, a more detailed example of the multi-layer infrastructure 112 is shown. In this embodiment, the multi-layer infrastructure 112 comprises compute, storage and network resources at lowest level 116 of the multi-layer infrastructure 112, and further comprises the plurality of upper layers 114 overlying the compute, network and storage resource at the lowest level 116.

The upper layers 114 include an application layer at a highest level of the multi-layer infrastructure 112. The additional upper layer underlying the application layer more particularly comprise an execution venue layer, a software-defined infrastructure layer, a node partition layer, and a node composer layer.

The layers of the multi-layer infrastructure 112 in this embodiment are also denoted as Layer 0, Layer 1, Layer 2, Layer 3, Layer 4 and Layer 5, in order of increasing layer number from the disaggregated hardware layer 116 comprising the compute, storage and network resources at the lowest level of the multi-layer infrastructure 112, to the application layer at the highest level of the multi-layer infrastructure 112.

Accordingly, Layers 0 through 5 of the FIG. 2 embodiment correspond to the disaggregated hardware layer, the node composer layer, the node partition layer, the software-defined infrastructure layer, the execution venue layer and the application layer, respectively, of the example multi-layer infrastructure 112. These layers are examples of what are also referred to herein as "infrastructure abstraction layers" of a multi-layer infrastructure.

The application layer in the FIG. 2 embodiment more particularly comprises a plurality of applications as well as a Platform-as-a-Service (PaaS) component. Other types of application layers can be used in other embodiments.

Also, the particular arrangement of multiple layers illustrated in FIG. 2 is presented by way of example only, and other arrangements of infrastructure abstraction layers of multi-layer infrastructure can be used in other embodiments. Accordingly, other embodiments can include only a subset of the layers shown in FIG. 2, as well as additional or alternative layers. A wide variety of different arrangements of multi-layer infrastructure may therefore be used in other embodiments.

Figure 3:
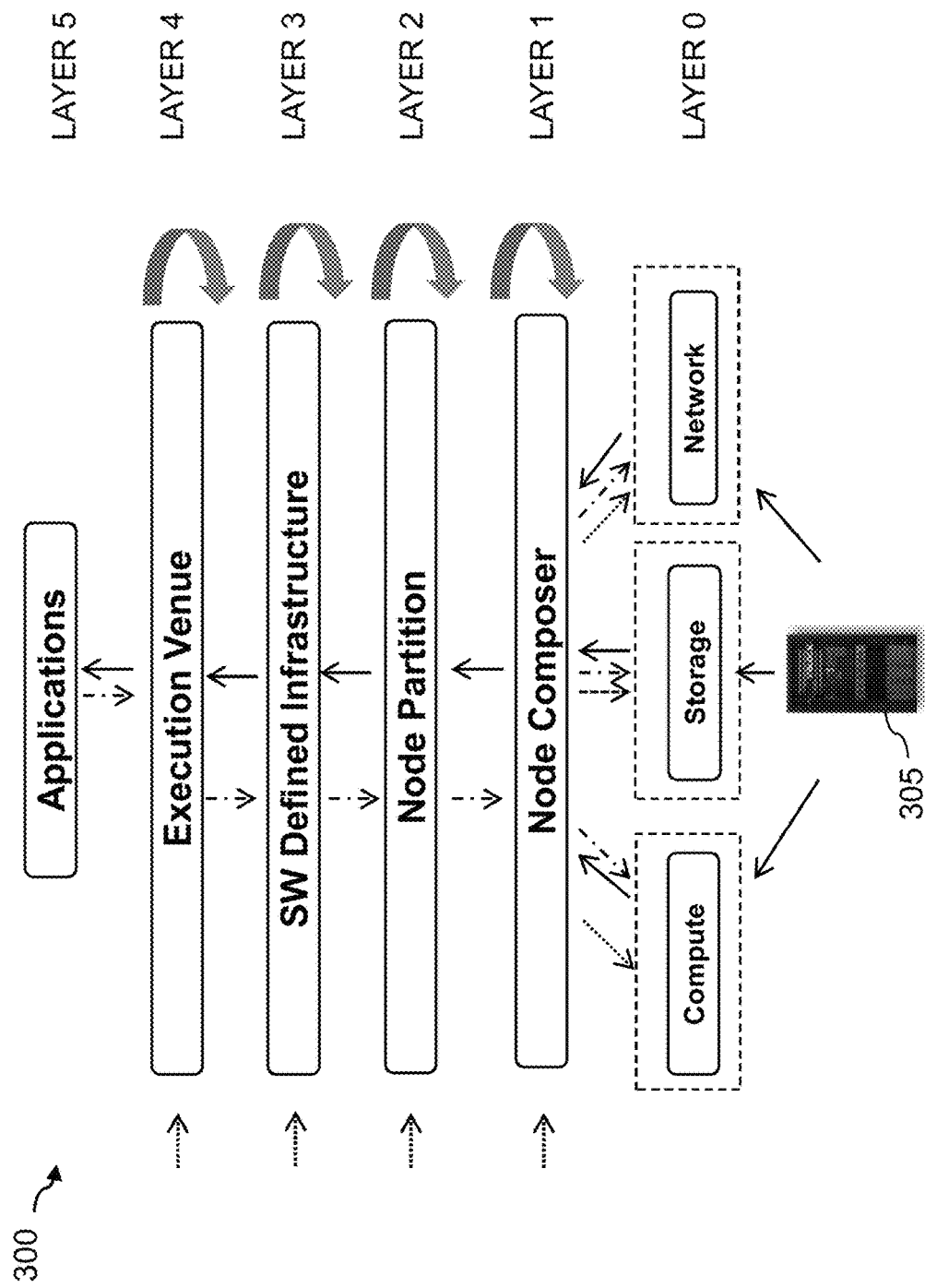
FIG. 3 illustrates various types of interactions between the infrastructure abstraction layers of the multi-layer infrastructure of FIG. 2.

FIG. 3 illustrates various types of interactions between the infrastructure abstraction layers of the multi-layer infrastructure 112 of FIG. 2. In this embodiment, a portion 300 of information processing system 100 running on one or more host devices 305 of processing platform 106 comprises the infrastructure abstraction layers Layer 0 through Layer 5 as previously described, including at Layer 0 the disaggregated hardware layer comprising compute, storage and network resources of the host devices 305 and at Layer 5 the application layer comprising multiple applications.

In this embodiment, different ones of the operational policies are ingested at respective different ones of the layers of the multi-layer infrastructure 112 other than the application layer. For example, as illustrated by the horizontal arrows at the left side of the figure, one or more operational policies are ingested by each of the execution venue layer, the software-defined infrastructure layer, the node partition layer and the node composer layer of the respective layers denoted Layer 4 through Layer 1.

As a more particular illustration, a given one of the operational policies may comprise a software-defined infrastructure operational policy that is ingested at the software-defined infrastructure layer of the multi-layer infrastructure 112 and applied to all software-defined infrastructure of the processing platform 106 that is subject to policy-based infrastructure management by the policy-based manager 110 in the processing platform 106. Other operational policies can be ingested and applied in a similar manner at respective other ones of the layers of the multi-layer infrastructure 112.

The application policy is ingested at the application layer of the multi-layer infrastructure 112 and distributed from layer to layer through each of the underlying layers of the multi-layer infrastructure 112.

Ingestion of the application policy into the application layer and ingestion of different operational policies into different ones of the layers other than the application layer is collectively initiated by the policy ingestion modules 120 of the policy-based manager 110.

Alternative policy ingestion arrangements may be used in other embodiments. For example, a common policy ingestion point may be used for multiple layers of the multi-layer infrastructure 112, with the policy ingestion point being configured to distribute policy to the relevant layers of the multi-layer infrastructure 112. Accordingly, in some embodiments, a given operational policy can be centrally ingested by the policy-based manager 110 and then distributed to the particular layer to which it relates.

The mutual enforcement of the operational and application policies is illustratively achieved in the multi-layer infrastructure 112 under control of at least a subset of the orchestrators 122, controllers 124 and M&O modules 126 at least in part by combining operational and application policies at respective policy control points of respective ones of the layers other than the application layer.

For example, combining operational and application policies at one of the policy control points of a given one of the layers illustratively comprises combining an operational policy ingested by the given layer with an application policy received by the given layer from an overlying layer to produce a combined policy for the given layer.

In conjunction with combining the operational and application policies at the policy control point of the given layer, a rule or requirement of the application policy that is in conflict with a rule or requirement of the operational policy may be overridden by the rule or requirement of the operational policy.

The combined policy is illustratively enforced within the given layer by converting the combined policy into one or more infrastructure-specific management and orchestration actions to be carried out in the given layer.

Another advantage of the illustrative embodiments of FIGS. 1, 2 and 3 is that the operational policies can be independently optimized with respect to the corresponding ones of the layers of the multi-layer infrastructure 112.

Moreover, updates to one or more of the operational policies do not necessitate any update to the application policy and updates to the application policy do not necessitate any updates to the operational policies.

In some embodiments, the policy-based manager 110 is configured to determine policies for respective different ones of the layers of the multi-layer infrastructure 112, with the policy for a given one of the layers defining rules and requirements relating to that layer, to enforce the policies at the respective layers of the multi-layer infrastructure 112, and to monitor performance of an application executing in the multi-layer infrastructure 112. In addition, one or more configuration parameters of the multi-layer infrastructure 112 may be adjusted based at least in part on a result of the monitoring.

Determining policies for respective ones of the layers of the multi-layer infrastructure 112 in such an embodiment illustratively comprises determining operational policies for each of a plurality of layers other than the application layer, determining an application policy for the application layer, propagating the application policy from the application layer through the other layers of the multi-layer infrastructure 112, and generating the policy for a given one of the layers of the multi-layer infrastructure 112 as a combination of the application policy and an operational policy for that layer.

Each of one or more of the layers of the multi-layer infrastructure 112 is associated with at least one of the orchestrators 122. A given such orchestrator is illustratively configured to receive an application policy from an overlying layer and to provide the application policy to an underlying layer, and to generate the policy for its corresponding layer as a function of an operational policy for that layer and the application policy.

Each of one or more of the layers of the multi-layer infrastructure 112 is further associated with at least one of the controllers 124. A given such controller is illustratively configured to receive the policy for the corresponding layer and to translate the policy into management and orchestration actions for that layer. The given controller is also configured to register inventory of the corresponding layer to one or more of the orchestrators 122 associated with that layer.

Additionally or alternatively, the given one of the controllers 124 may be configured to enforce the policy for the corresponding layer at least in part by identifying a deviation of a current state of designated infrastructure assets of that layer from a desired state of the designated infrastructure assets of that layer, and generating one or more additional management and orchestration actions for that layer responsive to the identified deviation.

The policy-based manager 110 in some embodiments is further configured to implement role-based access control (RBAC) for controlling access to operational policy definition functionality for respective ones of the layers of the multi-layer infrastructure 112. For example, only entities having particular roles may be permitted to define operational policy for at least portions of different ones of the layers.

It is to be appreciated that the particular processing platform configuration illustrated in the FIG. 1 embodiment is presented by way of example only, and that other embodiments can utilize other arrangements of additional or alternative components or layers. For example, the particular components 120, 122, 124 and 126 of the policy-based manager 110 and the particular layers of the multi-layer infrastructure 112 can be varied in other embodiments.

As mentioned previously, virtual resources implemented by the processing platform 106 illustratively comprise containers. Such containers are more particularly assumed to comprise respective Docker containers or other types of Linux containers (LXCs) that utilize operating system level virtualization.

In embodiments that utilize containers, the processing platform 106 illustratively comprises a plurality of container host devices each implementing one or more of the containers. Each of the container host devices illustratively comprises at least one processor coupled to a memory. Such container host devices are also considered examples of what are more generally referred to herein as "processing devices."

In some embodiments, Docker containers or other types of LXCs may be implemented on one or more Linux processing devices using Linux kernel control groups ("cgroups"). However, it is to be appreciated that embodiments of the present invention are not restricted to use with Docker containers or any other particular type of containers. Accordingly, numerous other techniques can be used in implementing containers in a given embodiment, and such techniques do not necessarily require use of the Linux cgroup feature. Clusters of containers can be managed across multiple container host devices of the processing platform 106 using container cluster managers such as Docker Swarm or Kubernetes. Such cluster managers may be implemented within or in association with a cloud-based system. For example, the PaaS layer in the FIG. 2 embodiment can be used to represent container cluster orchestrators such as Docker Swarm or Kubernetes.

The processing platform 106 illustratively incorporates one or more container engines, such as one or more Docker engines. By way of example, a given Docker engine may be preconfigured to run on CoreOS, an open source lightweight operating system based on the Linux kernel and particularly configured to provide functionality for deploying applications in containers. Another example of a lightweight operating system suitable for use in implementing at least portions of the processing platform 106 in some embodiments is VMware® Photon OS™ which has a relatively small footprint and is designed to boot extremely quickly on VMware® platforms.

The processing platform 106 in some embodiments incorporates components for providing certain types of management and orchestration functionality. Such components may include VCE Vision™ Intelligent Operations Software, or other types of management and orchestration components, including components from Pivotal Cloud Foundry, or various combinations of multiple ones of these or other components, including components such as VMware® Software-Defined Data Center (SDDC) or VMware® vRealize™.

In some embodiments, certain functionality of a cloud-based system is made available to a user by a cloud service provider on a Software-as-a-Service (SaaS) basis. Such users may be associated with respective ones of the user devices 102 and may correspond to respective tenants of the cloud service provider.

However, the term "user" in this context and elsewhere herein is intended to be more broadly construed so as to encompass, for example, human, hardware, software or firmware entities, as well as various combinations of such entities.

It should be understood that the particular arrangements of system and platform components as illustrated in FIG. 1 are presented by way of example only. In other embodiments, only subsets of these system and platform components, or additional or alternative sets of components, may be used, and such components may exhibit alternative functionality and configurations.

Examples of processing platforms that may be used to implement at least portions of the processing platform 106 of the FIG. 1 embodiment will be described in more detail below in conjunction with FIGS. 21 and 22. A given such processing platform comprises at least one processing device comprising a processor coupled to a memory, and the processing device may be implemented at least in part utilizing one or more virtual machines or other virtualization infrastructure.

Additional details regarding illustrative embodiments will now be provided with reference to FIGS. 4 through 20. The embodiments to be described include examples of multi-layer infrastructure 112 and associated functionality for policy-based manager 110 of the FIG. 1 embodiment. However, the disclosed features can be used to provide policy management solutions in a wide variety of different types of cloud-based systems and other information processing systems. It is therefore to be appreciated that the particular features described below and elsewhere herein are not requirements, but are instead possible features of illustrative embodiments. A given embodiment can therefore include only subsets of the described features, and may include additional or alternative features.

FIGS. 4 through 8 show examples of processing operations performed by components 120, 122, 124 and 126 of the policy-based manager 110 in conjunction with independent definition and mutual enforcement of operational and application policies in illustrative embodiments.

Figure 4:
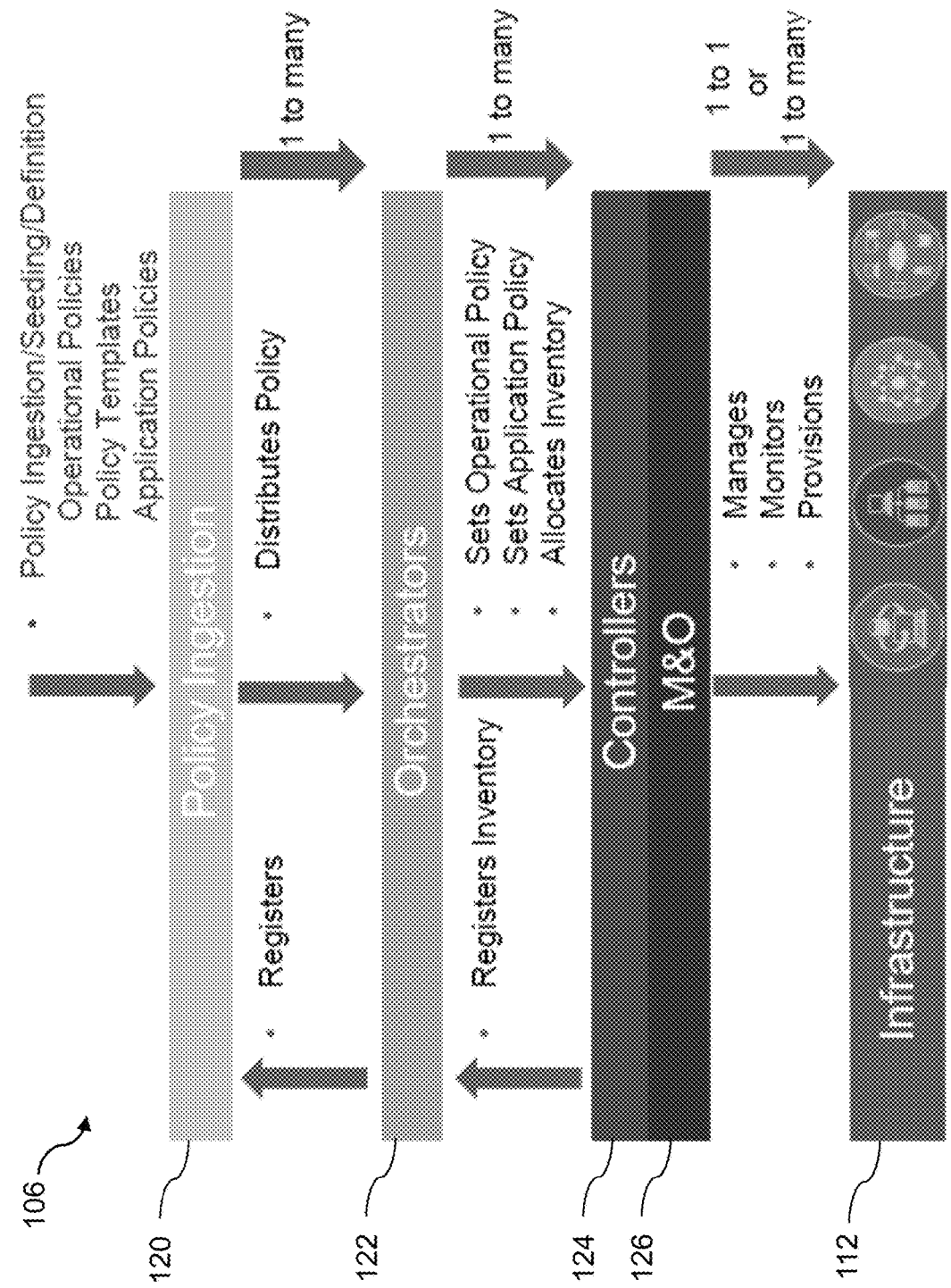
FIGS. 4 through 8 show examples of processing operations performed by components of a policy-based manager in conjunction with independent definition and mutual enforcement of operational and application policies in illustrative embodiments.

Referring initially to FIG. 4, examples of the functionality of components 120, 122, 124 and 126 of the policy-based manager 110 and the multi-layer infrastructure 112 are shown, as well as relationships between these components.

The policy ingestion modules 120 in this embodiment perform policy ingestion, seeding and definition operations relating to operational policies, application policies and policy templates. These modules each distribute policy on a one-to-many basis with underlying orchestrators 122 that register with the policy ingestion modules 120.

The orchestrators 122 in this embodiment are configured to set operational policy, to set application policy and to allocate inventory on a one-to-many basis with the underlying controllers 124.

The controllers 124 in this embodiment are configured to register their inventory with the orchestrators 122. The controllers 124 also interact with underlying M&O modules 126.

The M&O modules 126 interact on a one-to-one or a one-to-many basis with components of the multi-layer infrastructure 112. This involves performing functions such as managing, monitoring and provisioning the components of the multi-layer infrastructure 112.

Figure 5:
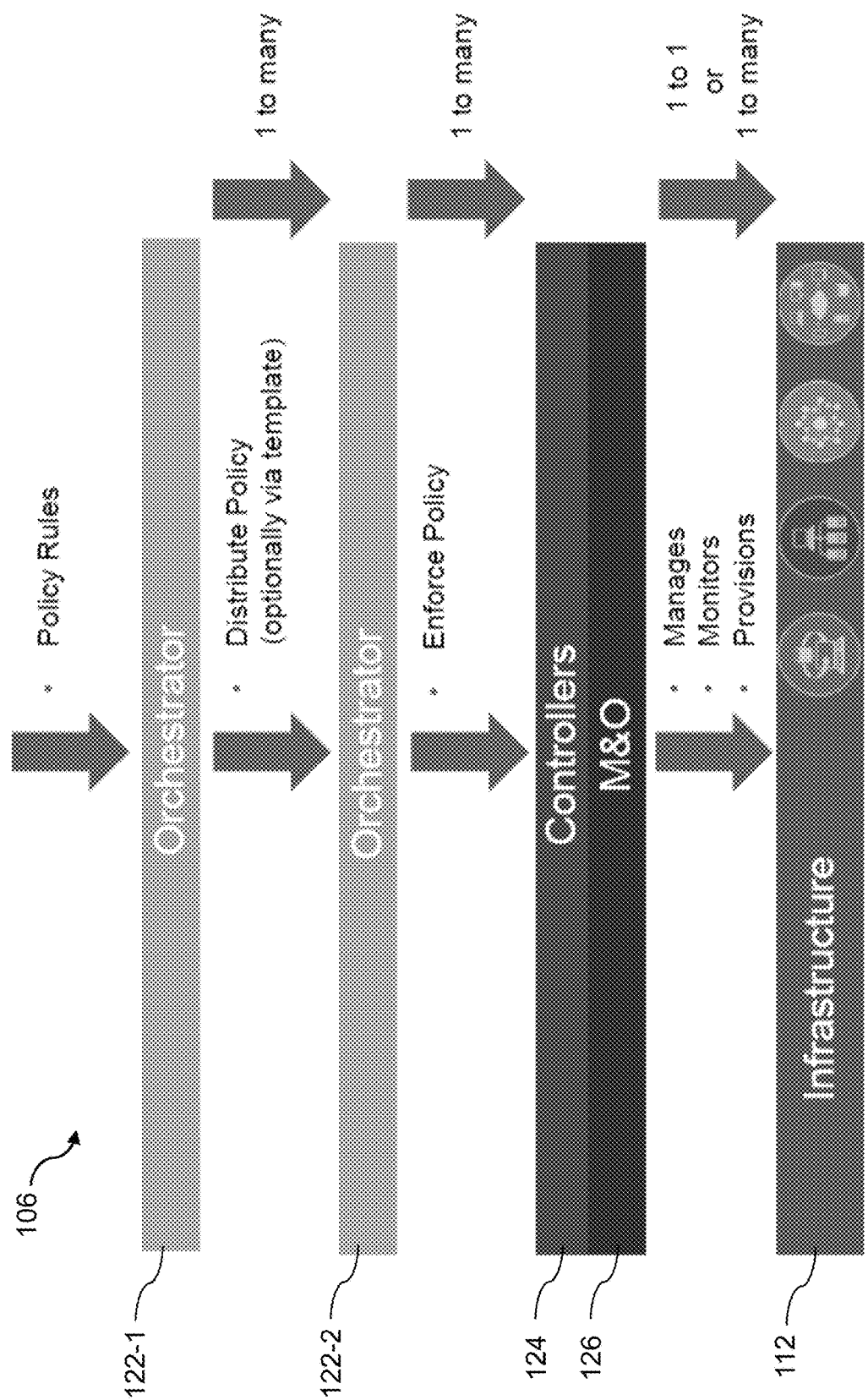

FIG. 5 illustrates policy distribution in an illustrative embodiment. In this embodiment, orchestrators 122 more particularly comprise first and second orchestrators 122-1 and 122-2 as shown. The first orchestrator 122-1 receives policy rules, and distributes policy, optionally via one or more templates. The second orchestrator 122-2 interacts with controllers 124 to enforce policy. The first orchestrator 122-1 may be viewed as an example of a "parent" orchestrator relative to the second orchestrator 122-2, and the second orchestrator 122-2 may similarly be viewed as an example of a "child" orchestrator relative to the first orchestrator 122-1. Other types of parent-child orchestrator relationships may exist in other embodiments. The M&O modules 126 again perform functions such as managing, monitoring and provisioning the components of the multi-layer infrastructure 112 based at least in part on the distributed policy.

Figure 6:
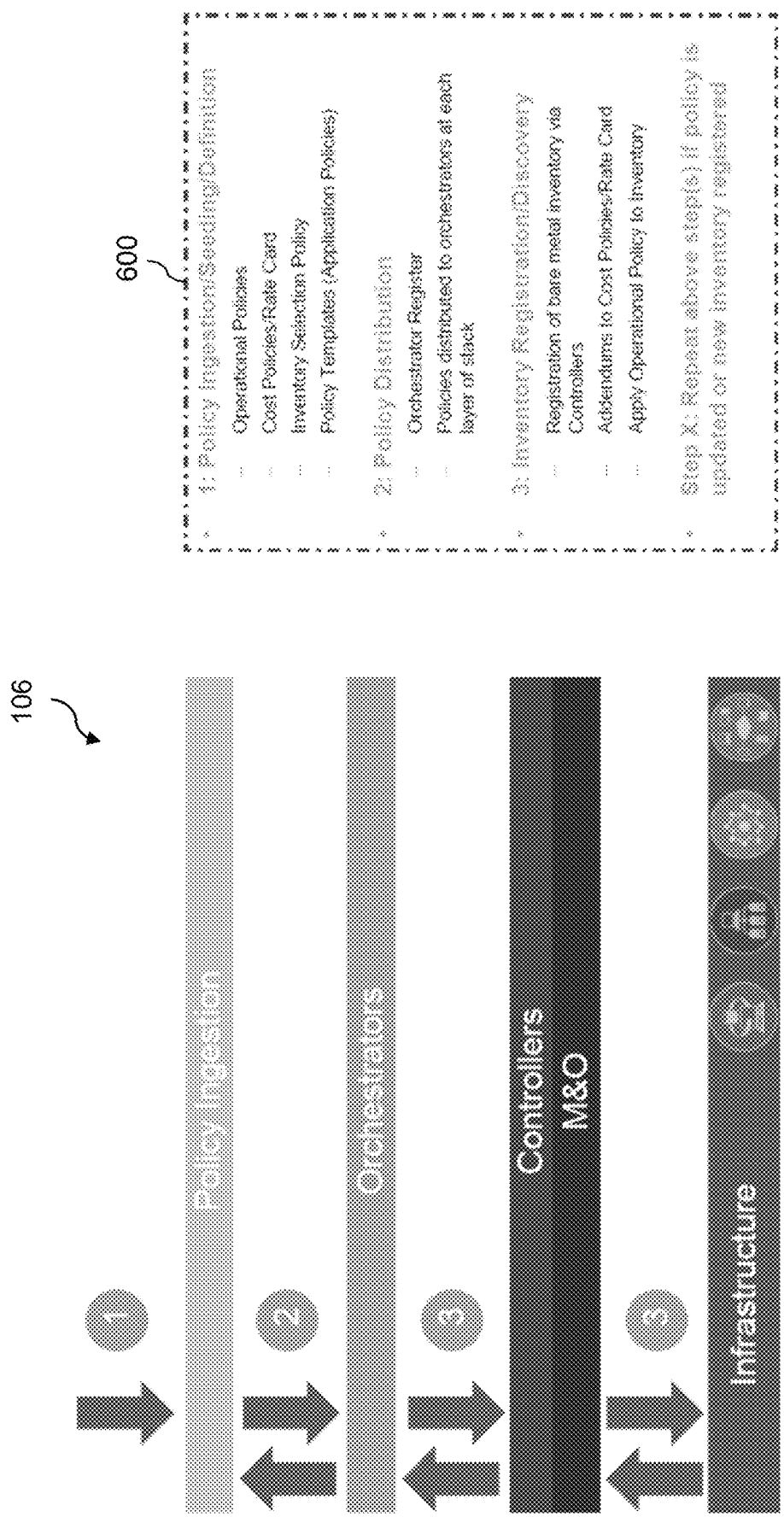
Figure 7:
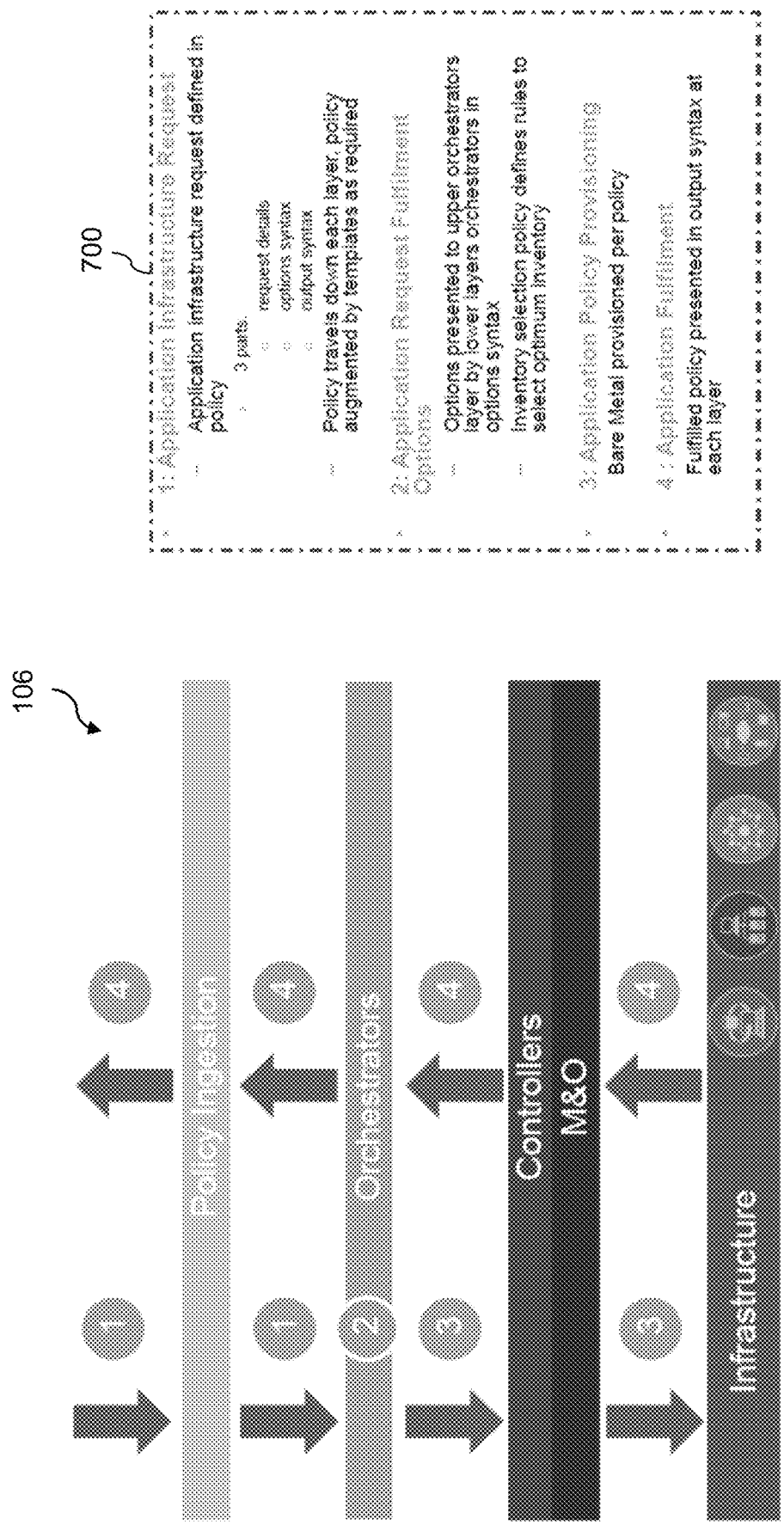
Figure 8:
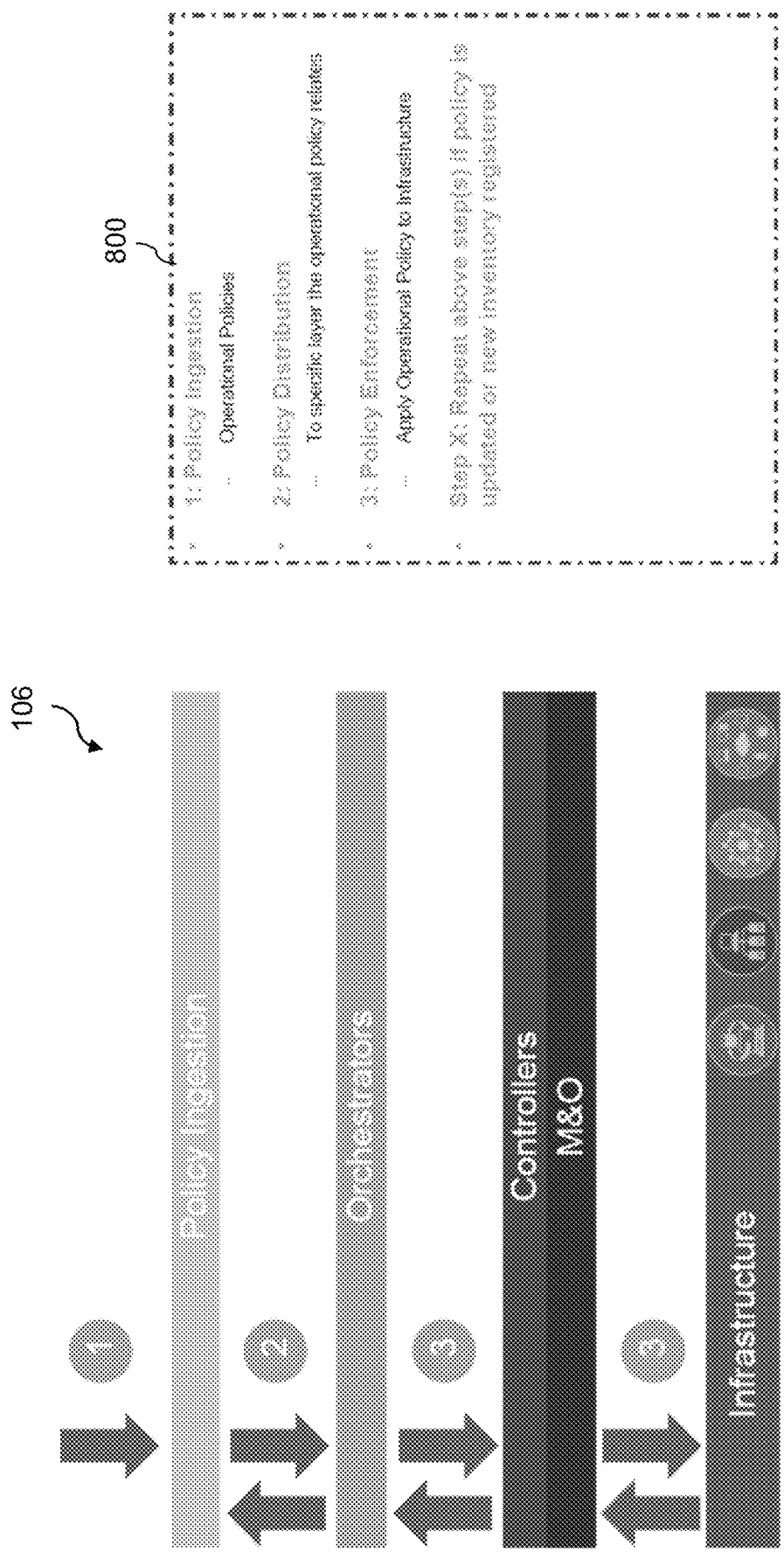

FIG. 6 shows processing operations 600 associated with a startup portion of a policy lifecycle in an illustrative embodiment. The processing operations 600 include the following steps, corresponding generally to the numbered upward/downward arrows between components in the figure:

1. Policy Ingestion/Seeding/Definition
   Operational Policies
   Cost Policies/Rate Card
   Inventory Selection Policy
   Policy Templates (Application Policies)
2. Policy Distribution
   Orchestrator Register
   Policies distributed to orchestrators at each layer of stack
3. Inventory Registration/Discovery
   Registration of bare metal inventory via Controllers
   Addendums to Cost Policies/Rate Card
   Apply Operational Policy to Inventory
   Step X: Repeat above step(s) if policy is updated or new inventory registered FIG. 7 shows processing operations 700 associated with an application policy of a policy lifecycle in an illustrative embodiment. The processing operations 700 include the following steps, corresponding generally to the numbered upward/downward arrows between components in the figure:

1. Application Infrastructure Request
   Application infrastructure request defined in policy (e.g., request details, options syntax, output syntax)
   Policy travels down each layer, policy augmented by templates as required
2. Application Request Fulfilment Options
   Options presented to upper layer orchestrators by lower layer orchestrators in options syntax
   Inventory selection policy defines rules to select optimum inventory
3. Application Policy Provisioning
   Bare metal provisioned per policy
4. Application Fulfilment
   Fulfilled policy presented in output syntax at each layer FIG. 8 shows processing operations 800 associated with an operational policy of a policy lifecycle in an illustrative embodiment. The processing operations 800 include the following steps, corresponding generally to the numbered upward/downward arrows between components in the figure:

1. Policy Ingestion
   Operational Policies
2. Policy Distribution
   To specific layer the operational policy relates
3. Policy Enforcement
   Apply Operational Policy to Infrastructure
   Step X: Repeat above step(s) if policy is updated or new inventory registered It is to be appreciated that the particular steps shown in FIGS. 6, 7 and 8 are presented by way of illustrative example only, and should not be construed as limiting in any way. Additional or alternative processing operations can be implemented by the policy-based manager 110 and its components 120, 122, 124 and 126 in other embodiments.

Figure 9:
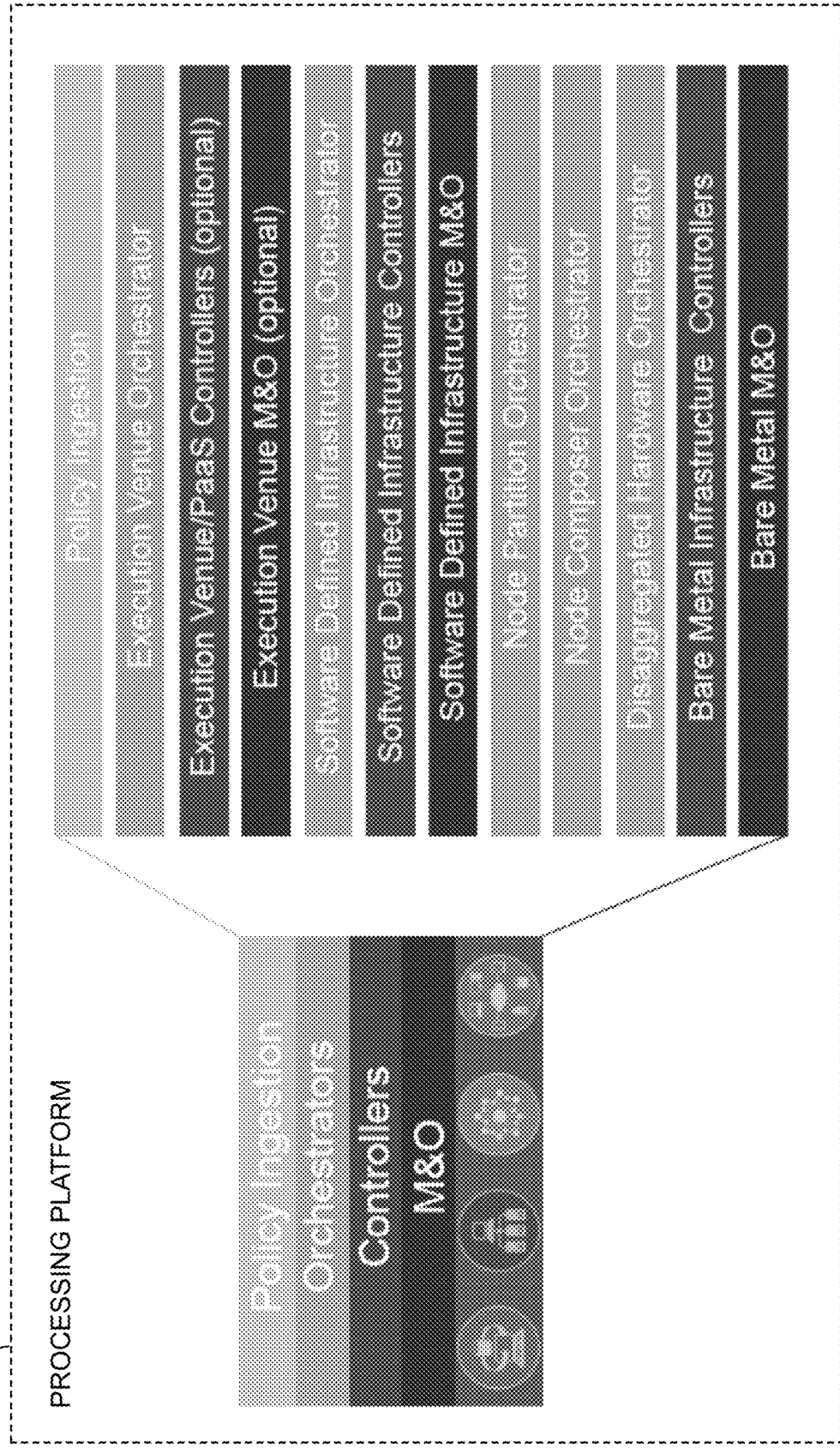
FIG. 9 shows a more detailed view of a portion of a processing platform comprising a policy-based manager in an illustrative embodiment.

Referring now to FIG. 9, a more detailed view of a portion of the processing platform 106 is shown. In this embodiment, the orchestrators 122, controllers 124 and M&O modules 126 of the policy-based manager 110 are each shown in an expanded view as more particularly comprising different components corresponding to respective different layers of the multi-layer infrastructure 112. These different layers include the execution venue layer, the software-defined infrastructure layer, the node partition layer, the node composer layer, and the disaggregated hardware layer.

The orchestrators 122 of the policy-based manager 110 in this embodiment more particularly comprise an execution venue orchestrator, a software-defined infrastructure orchestrator, a node partition orchestrator, a node composer orchestrator, and a disaggregated hardware orchestrator.

The controllers 124 of the policy-based manager 110 in this embodiment more particularly comprise execution venue and PaaS controllers, software-defined infrastructure controllers, and bare metal infrastructure controllers. It should be noted that references herein to "bare metal" components include physical servers or computers as opposed to virtual servers or computers. Such bare metal components are assumed to be part of the disaggregated hardware layer 116 of the multi-layer infrastructure 112.

The M&O modules 126 of the policy-based manager 110 in this embodiment more particularly comprise an execution venue M&O module, a software-defined infrastructure M&O module, and a bare metal M&O module.

The execution venue M&O module in some embodiments is implemented utilizing a cluster manager such as Docker Swarm or Kubernetes.

Although certain components of the policy-based manager 110 are indicated in FIG. 9 and in other figures herein as being optional components, this should not be construed as an indication that any other particular components are required components of the corresponding illustrative embodiments. As indicated previously, additional or alternative components can be used in other embodiments.

Examples of processing operations performed by particular components in the expanded view of the policy-based manager 110 of FIG. 9 will now be described with reference to FIGS. 10 through 12.

Figure 10:
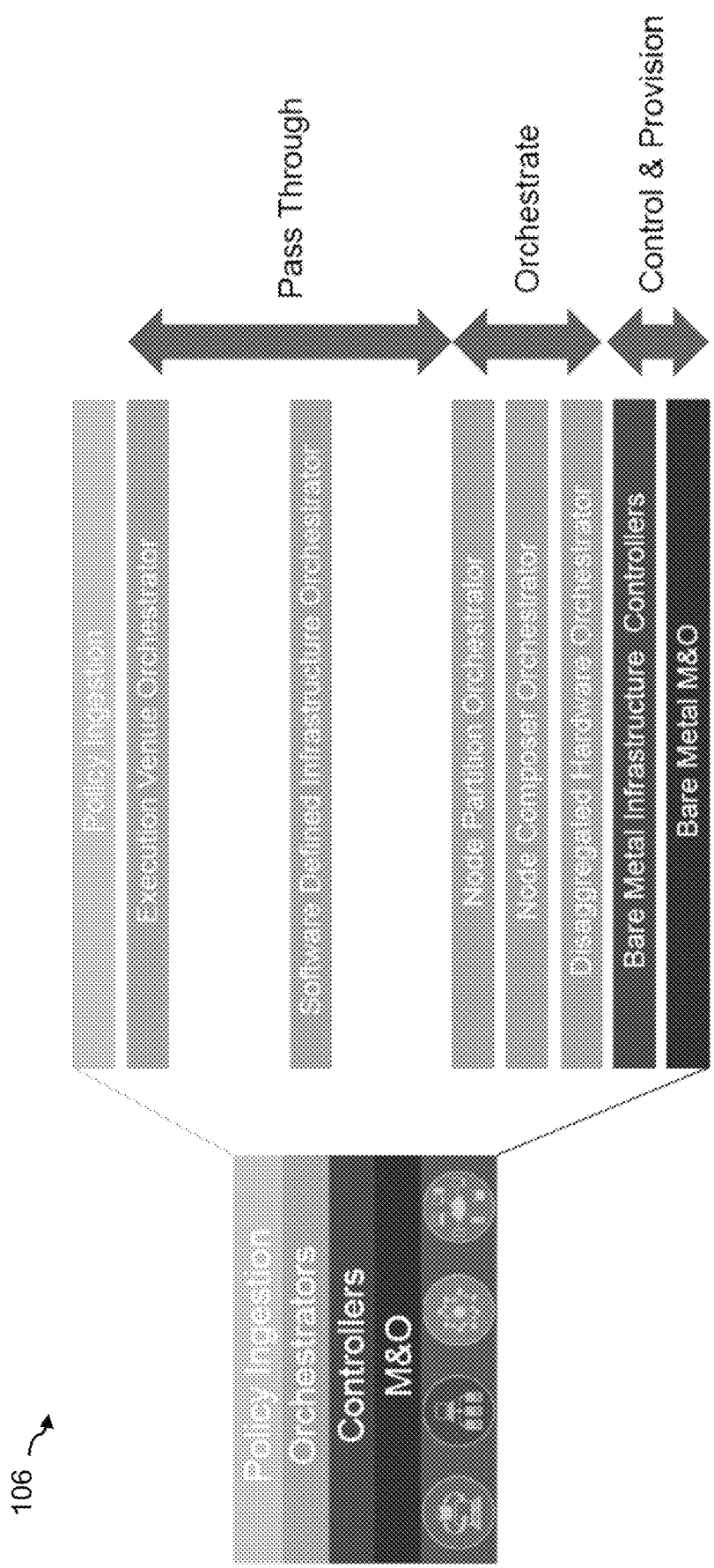
FIGS. 10 through 12 show examples of processing operations performed by particular components of the policy-based manager of FIG. 9.

FIG. 10 more particularly illustrates an example policy flow for a bare metal policy. The policy is ingested by one of the policy ingestion modules 120 of the policy-based manager 110, and passes through the execution venue and software-defined infrastructure orchestrators as shown. The bare metal policy is then orchestrated by the node partition, node composer and disaggregated hardware orchestrators. Corresponding control and provision operations for the bare metal policy are performed by the bare metal infrastructure controllers and the bare metal M&O module.

Figure 11:
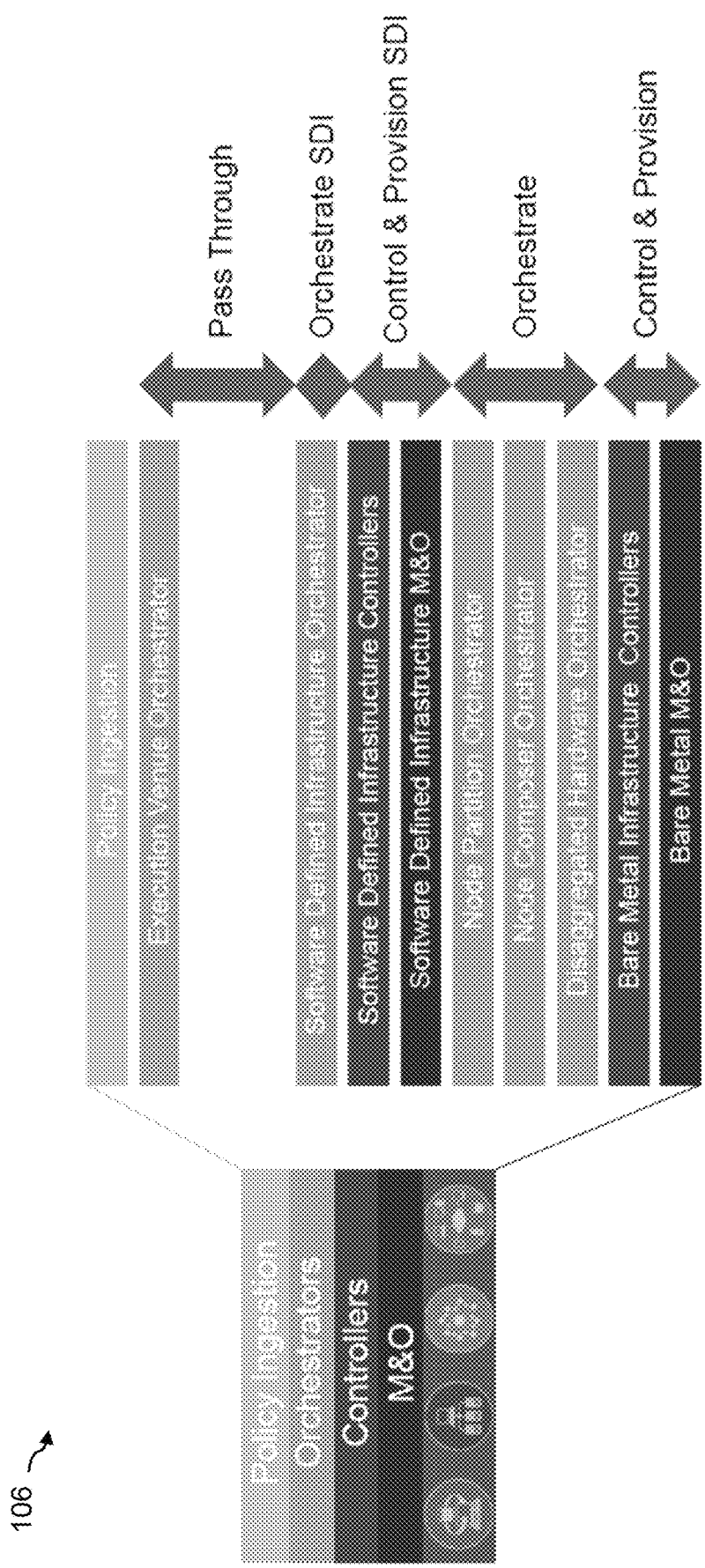

FIG. 11 more particularly illustrates an example policy flow for a software-defined infrastructure policy. The policy is ingested by one of the policy ingestion modules 120 of the policy-based manager 110, and passes through the execution venue orchestrator as shown. The software-defined infrastructure policy is then orchestrated by the software-defined infrastructure orchestrator. Corresponding control and provision operations for the software-defined infrastructure policy are performed by the software-defined infrastructure controllers and the software-defined infrastructure M&O module. Additional orchestration is performed by the node partition, node composer and disaggregated hardware orchestrators, and corresponding control and provision operations are performed by the bare metal infrastructure controllers and the bare metal M&O module.

Figure 12:
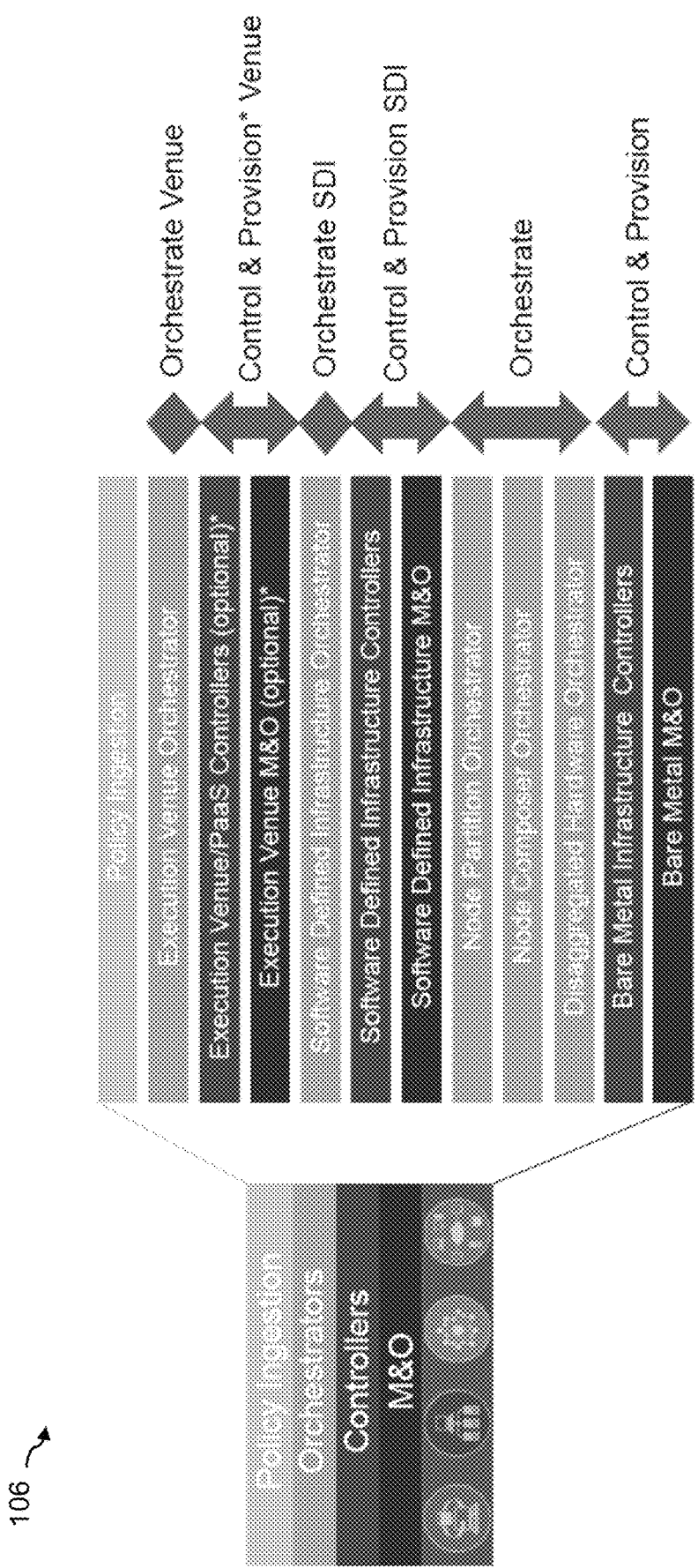

FIG. 12 more particularly illustrates an example policy flow for an execution venue policy. The policy is ingested by one of the policy ingestion modules 120 of the policy-based manager 110, and is provided to the execution venue orchestrator as shown. The execution venue policy is then orchestrated by the execution venue orchestrator. Corresponding control and provision operations for the execution venue policy are performed by the execution venue/PaaS controllers and the execution venue M&O module. Additional orchestration is performed by the software-defined infrastructure orchestrator, and corresponding control and provision operations are performed by the software-defined infrastructure controllers and the software-defined infrastructure M&O module. Further orchestration is performed by the node partition, node composer and disaggregated hardware orchestrators, and corresponding control and provision operations are performed by the bare metal infrastructure controllers and the bare metal M&O module.

Additional functionality of the policy-based manager 110 will now be described with reference to FIGS. 13 through 15.

Figure 13:
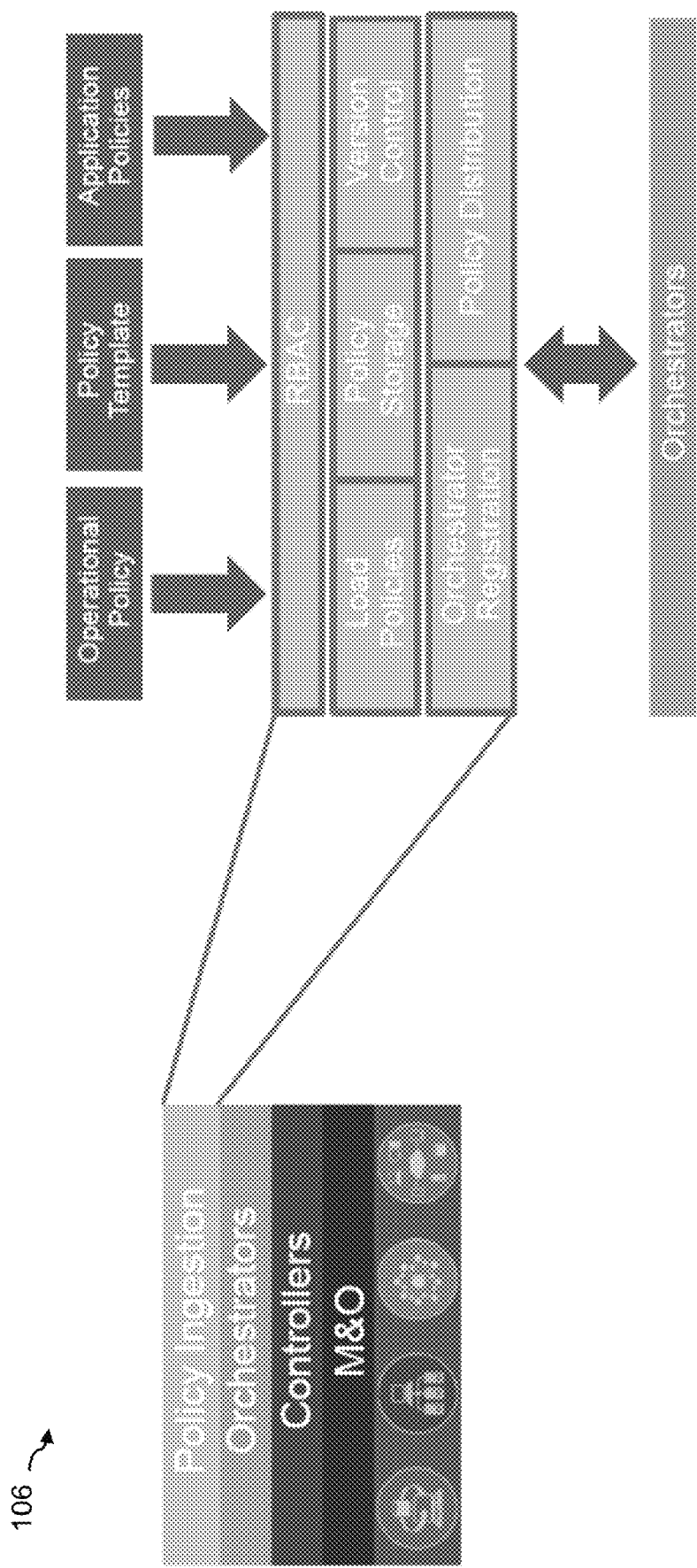
FIGS. 13 through 15 show additional functionality of the policy-based manager of FIG. 9 in illustrative embodiments.

FIG. 13 illustrates additional functionality associated with the policy ingestion modules 120 of the policy-based manager 110. In this embodiment, the policy ingestion modules 120 are configured to ingest operational and application policies and one or more associated policy templates as shown. The policy ingestion modules 120 have an RBAC interface that provides authenticated access to internal components including a load policies component, policy storage and a version control component. The policy ingestion modules 120 further comprise an orchestrator registration component and a policy distribution component for interfacing with the orchestrators 122.

Figure 14:
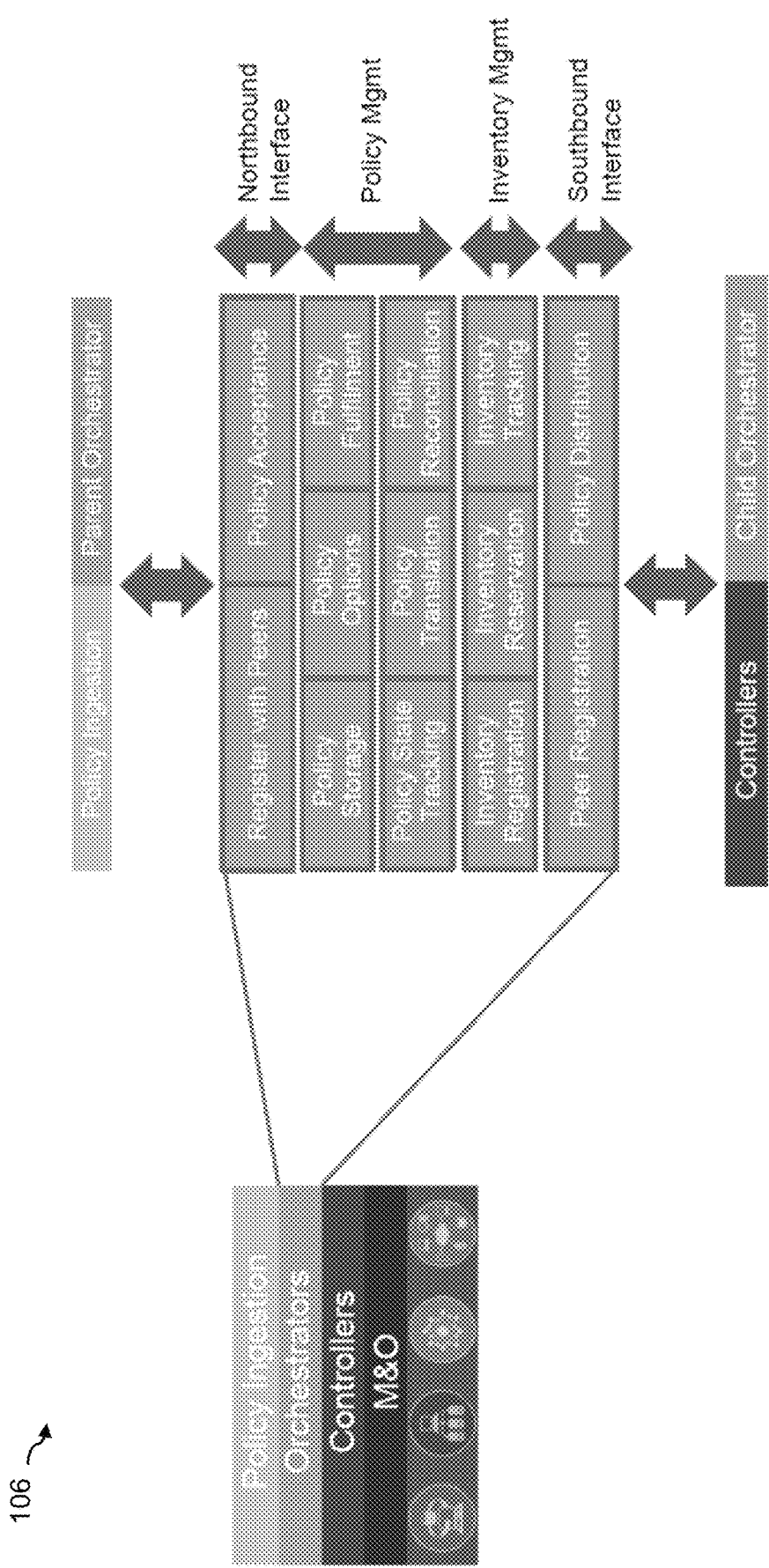

FIG. 14 illustrates additional functionality associated with the orchestrators 122 of the policy-based manager 110. In this embodiment, the orchestrators 122 each have a "northbound" interface to the policy ingestion modules 120 and to one or more parent orchestrators, with the interface comprising a register with peers component and a policy acceptance component. The orchestrators 122 further comprise policy management components including components for policy storage, policy options, policy fulfilment, policy state tracking, policy translation and policy reconciliation. Additional components of the orchestrators 122 include inventory management components, more particularly comprising components for inventory registration, inventory reservation and inventory tracking, and a "southbound" interface including peer registration and policy distribution components for interfacing with the controllers 124 and one or more child orchestrators.

Figure 15:
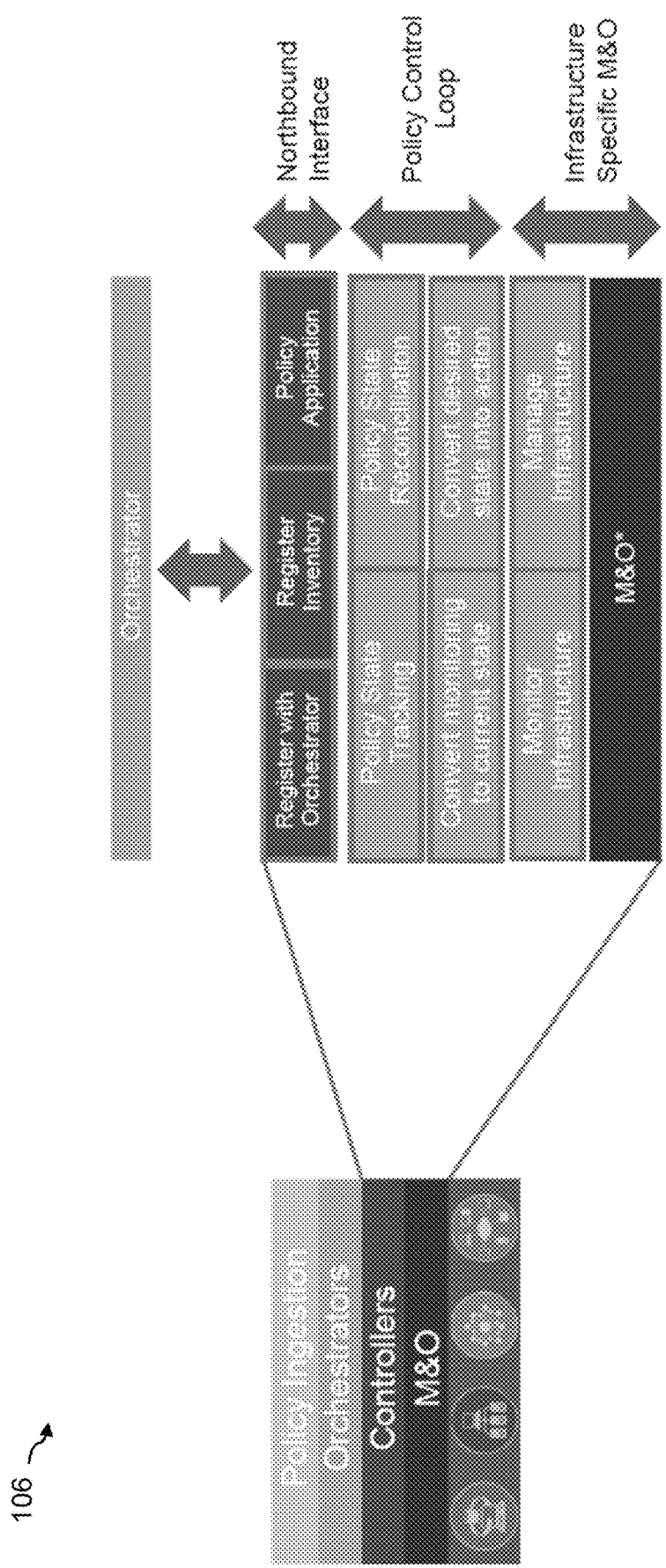

FIG. 15 illustrates additional functionality associated with the controllers 124 and M&O modules 126 of the policy-based manager 110. In this embodiment, the controllers 124 have a "northbound" interface to the orchestrators 122. The controllers 124 further comprise policy control loop components including components for policy state tracking, policy state reconciliation, converting monitoring to current state, and converting desired state into action. Additional components of the controllers 124 include components for monitoring and managing infrastructure. These monitoring and managing components cooperate with the M&O modules 126 to perform infrastructure specific M&O functionality. The M&O modules 126 in some embodiments are configured to leverage off-the-shelf or out-of-box capabilities of the multi-layer infrastructure 112.

Examples of independent definition and mutual enforcement of operational and application policies in illustrative embodiments will now be described with reference to FIGS. 16 through 20. In each of these figures, the portion 300 of information processing system 100 running on one or more host devices 305 of processing platform 106 is shown, including the infrastructure abstraction layers of the multi-layer infrastructure 112 as previously described. These include the application layer, execution venue layer, software-defined infrastructure layer, node partition layer, node composer layer and disaggregated hardware layer, also referred to as Layer 5 through Layer 0, respectively.

Also shown in FIGS. 16 through 20 are respective portions of policy-related process flow involving the multi-layer infrastructure 112.

Figure 16:
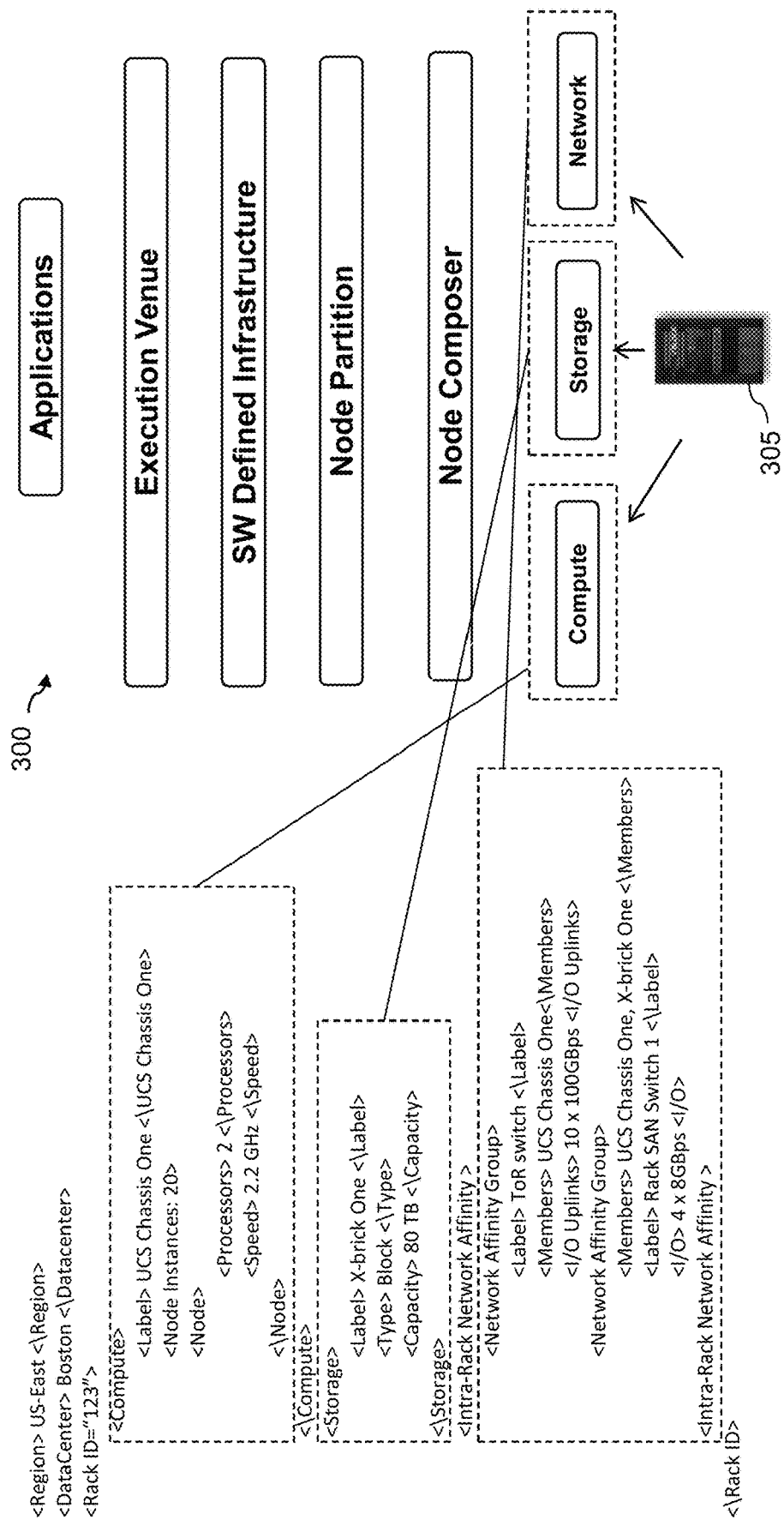
FIGS. 16 through 20 show examples of independent definition and mutual enforcement of operational and application policies in illustrative embodiments.

FIG. 16 illustrates a portion of a policy-related process flow associated with infrastructure power-up. More particularly, the compute, storage and network resources of the disaggregated hardware layer are powered up in a particular configuration as illustrated by the corresponding code at the left side of the figure.

Figure 17:
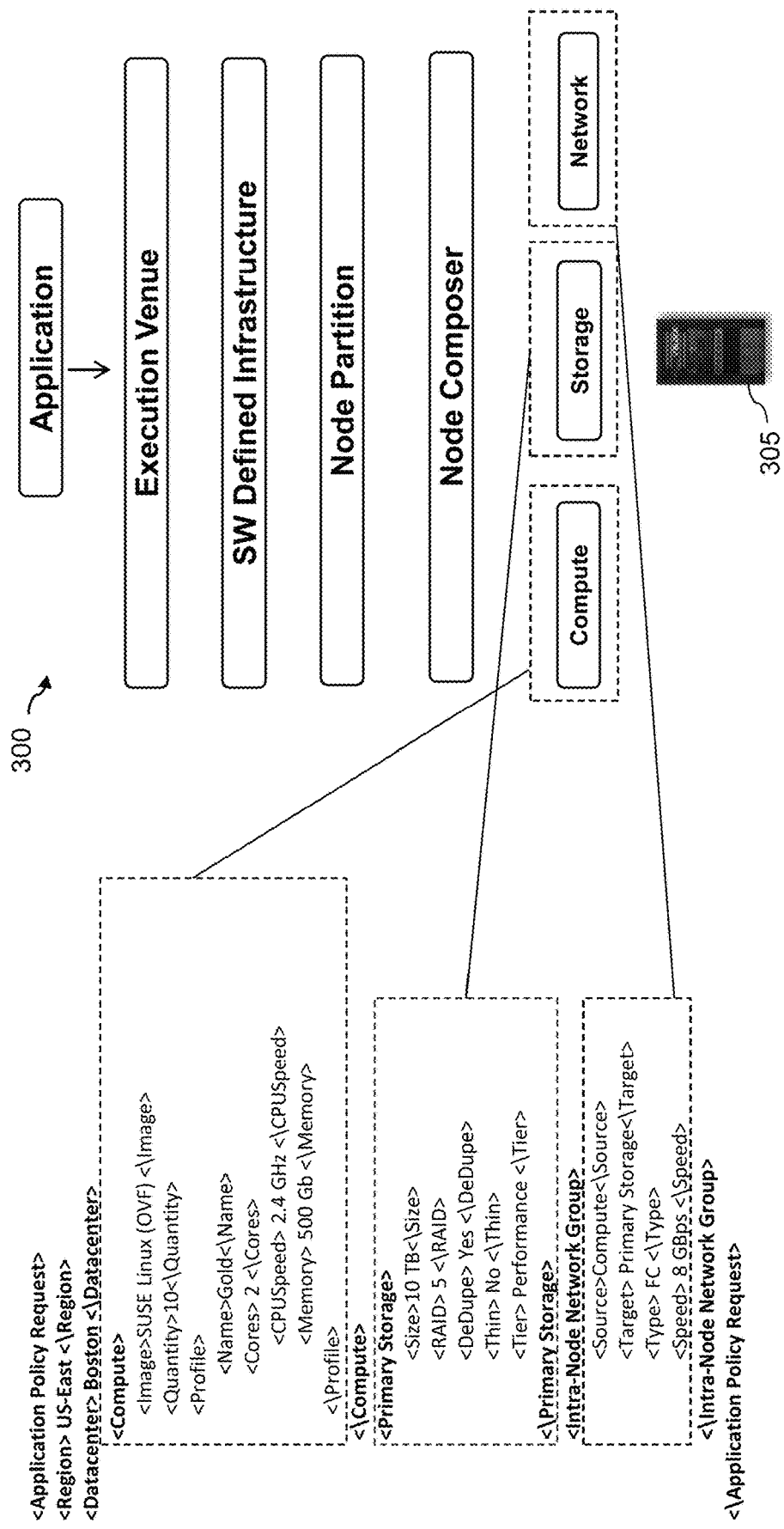

FIG. 17 illustrates another portion of the policy-related process flow, more particularly including an application policy request relating to the compute, storage and network resources of the disaggregated hardware layer. The application policy in this embodiment specifies particular configuration parameters and other features of the resources to be used for execution of a corresponding application.

Figure 18:
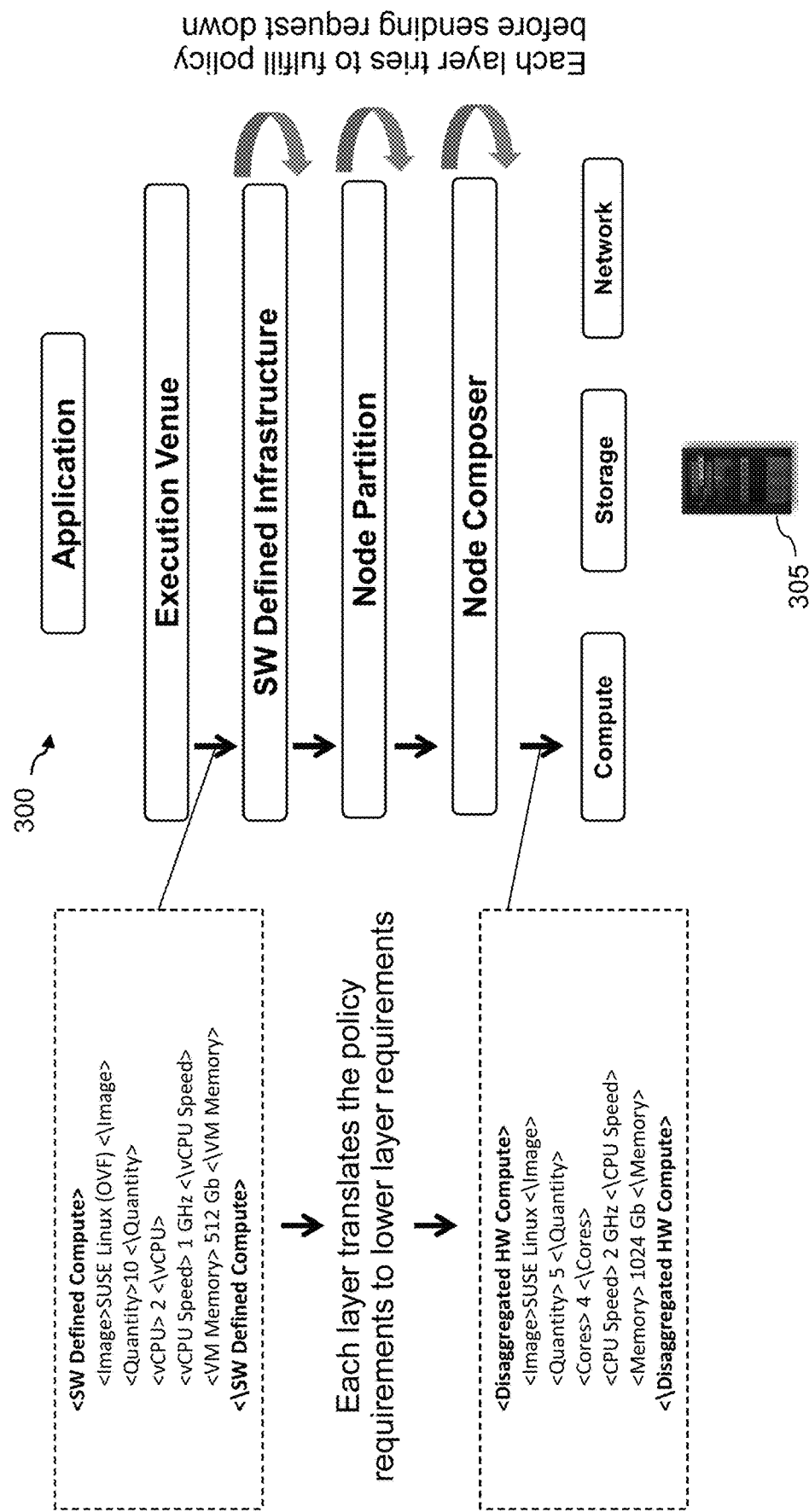

FIG. 18 illustrates the manner in which the application policy traverses the layers of the multi-layer infrastructure and is modified accordingly at one or more of the layers. More particularly, in this embodiment each of the layers translates the policy requirements to lower layer requirements consistent with the operational policies of the respective layers of the multi-layer infrastructure.

Figure 19:
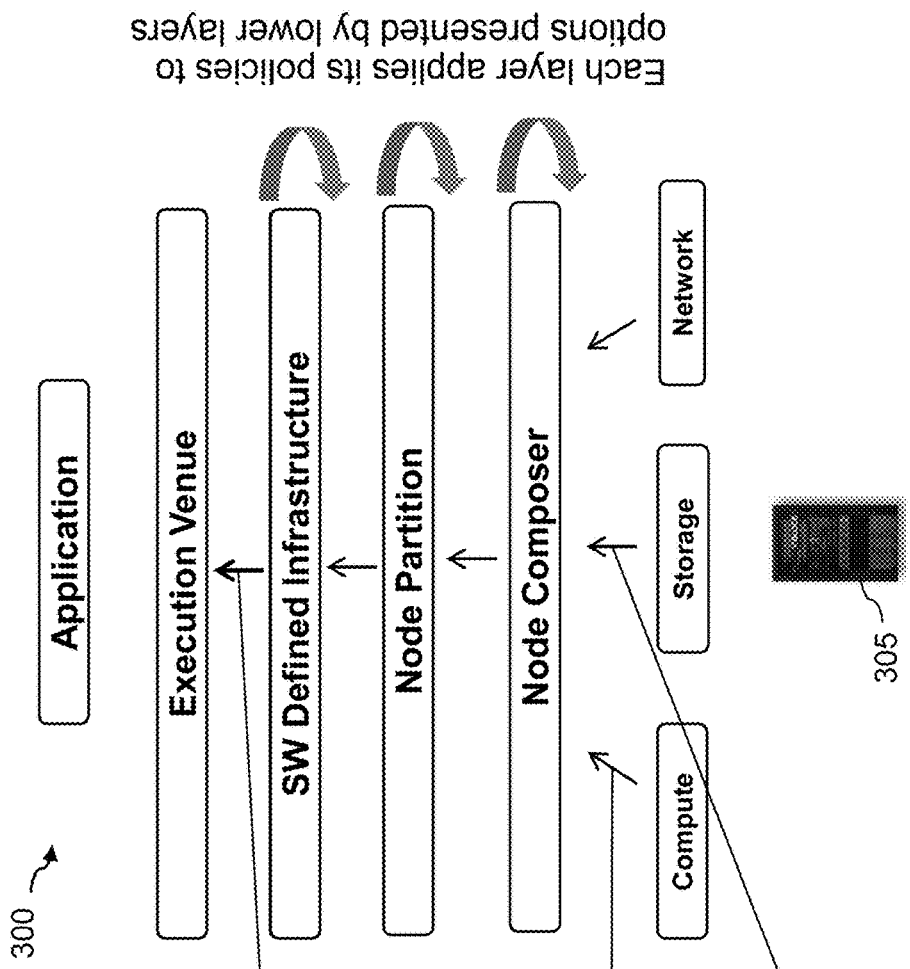

FIG. 19 illustrates a portion of the policy-related process flow involving the presentation of various options upward through the layers. In this embodiment, the execution venue layer picks an option based on a cost/network map.

Figure 20:
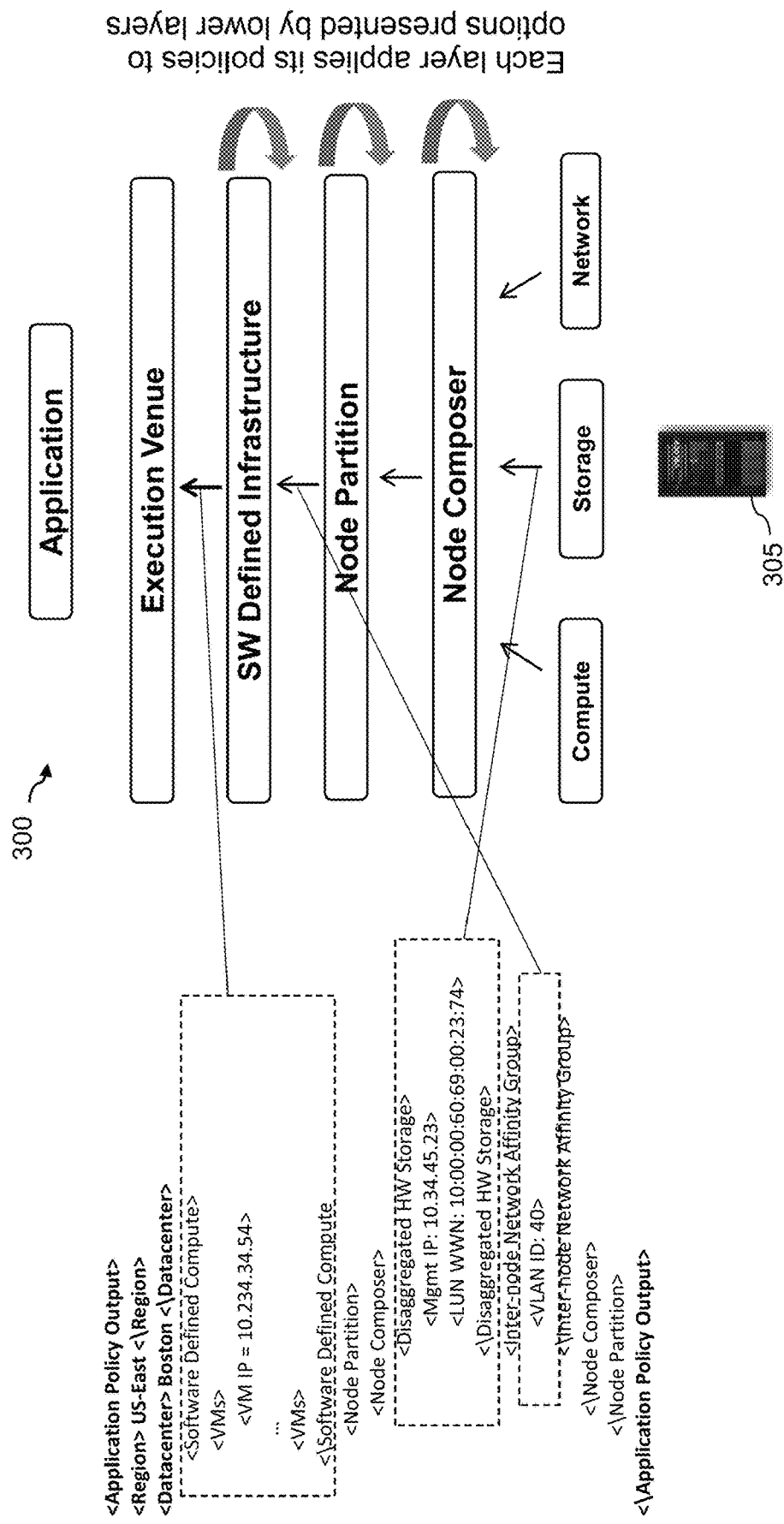

FIG. 20 illustrates a portion of the policy-related process flow showing fulfillment of the application policy in a manner consistent with the operational policies of the various layers.

The particular policy-related process flow illustrated in FIGS. 16-20 is presented by way of illustrative example only, and a wide variety of alternative arrangements can be used in other embodiments.

As described above, the policy-based manager 110 of processing platform 106 in illustrative embodiments is configured for independent definition and mutual enforcement of operational and application policies across the layers of the multi-layer infrastructure 112. Such arrangements can provide considerable advantages over conventional policy management arrangements.

For example, illustrative embodiments overcome the following significant problems that can arise when operational and application policies are not independently defined:

1. When operational rules and application requirements are defined in the same policy, it is not possible to enforce role based access to policy rule definition. As a result, an application developer has the access rights to define operational rules even though they may have limited expertise in the operational domain and similarly an operations engineer can define application requirements with limited application domain expertise.

2. Because operational rules and application requirements are defined in a single policy, each policy is unique to the application and it is necessary to duplicate operational rules in each policy. Duplication of operational rules is inefficient and introduces risk in terms of cascading of policy errors, copying errors and non-subject matter experts being forced to write operational policy rules.

3. The overhead associated with managing operational policy rules is significant as in order to maintain operational governance the operations team must review each policy created by application developers or create policies on behalf of developers. The overhead of maintaining operational consistency increases exponentially as the number of applications and associated policies increases.

4. Maintaining and updating operational rules is challenging as in order to update a single rule, every application policy containing that rule must be updated. Additionally this challenge acts as a barrier to optimizing infrastructure operational configurations due to the sheer overhead of doing so.

As mentioned previously, illustrative embodiments disclosed herein manage real-time infrastructure configurations through independent definition of operational policies (e.g., operational boundaries of the infrastructure) and application policies (e.g., application workload utilization requirements of the system).

While the definition of operational and application policies is independent in illustrative embodiments, mutual enforcement is achieved under the control of policy-based manager 110, for example, by combining operational and application policies at policy enforcement/control points at each layer of the multi-layer infrastructure 112. One or more operational policies for each of the layers can be managed and optimized independently of the operational policies for the other layers and independently of the application policy.

Illustrative embodiments provide clear separation in the definition of operational policy and application policy.

In a data center environment, the IT operations team is responsible for ensuring the data center is operating effectively and for setting the operational policy (e.g., the operational bounds of the infrastructure). An application development team is responsible for creating the application workloads that run on the infrastructure. In order to enable these teams to function independently within their domain of expertise, illustrative embodiments clearly distinguish between operational policy and application policy.

As described elsewhere herein, operational policy illustratively defines the operational rules related to the IT infrastructure, and application policy illustratively defines the operating rules and requirements of an application running on the IT infrastructure.

In illustrative embodiments, operational and application policies are independently defined. For example, the members of the IT operations team may be assigned access to operational policy definition and the members of the application development team may be assigned access to application policy definition. The IT operations team defines operational policy for each layer of the multi-layer infrastructure 112 and the operational policy for a specific layer is ingested at that layer. When deploying an application, the application development team defines an application policy specific to the application and this is ingested at the application layer of the multi-layer infrastructure 112 and each layer distributes policy to the next layer. Accordingly, configuration of the system 100 advantageously prevents a member of the IT operations team from defining application policy and prevents a member of the applications development team from defining operational policy.

In addition, operational rules are defined in operational policy so there is no duplication. Because the operational policy is defined independent of application policy, operational policy only needs to be written once and is applied throughout the multi-layer infrastructure 112 without the need to write duplicate policies. For example, an IT operator with responsibility for the software-defined infrastructure layer can create a software-defined infrastructure operational policy and this policy is ingested at the layer and applied to all software-defined infrastructure under the control of the policy-based manager 110.

As described above, operational consistency is achieved in illustrative embodiments through mutual enforcement of operational and application policies. For example, operational and application policies are defined independently and mutually enforced at each layer of the multi-layer infrastructure 112.

In order to support mutual enforcement, each layer has the capability to ingest operational and application policies. Each layer can combine operational and application policies and treat the combined policies as a single policy. When combining policies, in the event an application policy rule or requirement conflicts with an operational policy rule or requirement, the policy-based manager 110 may be configured such that the operational policy rule or regulation automatically takes precedence. This combined policy may then be enforced by converting it into infrastructure specific M&O actions for the corresponding layer.

Illustrative embodiments also provide an ability to optimize operational policy without the need to update application policy. Because the operational policy is defined independent of the application policy, it is possible to optimize operational policy at each layer without the need to update any application policy. For example, the IT operator can update the operational policy with new rules and these rules are then seamlessly applied and enforced at each layer of multi-layer infrastructure 112 without the need to change the application policies. These new operational rules are applied to the application through mutual enforcement under the control of the policy-based manager 110 as described previously.

Independent definition of operational and application policy as disclosed herein creates a clear dividing line between the domain of application development and IT operations which enables both groups define policy autonomously across a shared IT infrastructure.

The combination of operational and application policies to enable mutual enforcement at each of a plurality of layers of the multi-layer infrastructure 112 supports an additional level of operational governance in system 100 whereby an application policy rule that is not in line with operational policy is vetoed by operational policy. It also provides automated enforcement of operational consistency across applications.

In addition, the ability to optimize operational policy independently at each layer of the multi-layer infrastructure 112 creates an opportunity to optimize the infrastructure in an iterative fashion where the IT operator can tweak and adjust operational policy within a defined scope. It also presents opportunities for new capabilities such as adjusting workload placements in real-time via policy. For example, the IT operator could define an operational rule such that application workloads of type X are hosted on a private cloud and application workloads of type Y are hosted on a public cloud. This operational rule could then be adjusted in real-time and via the automated policy enforcement functionality of system 100 the application workloads are moved without the need to update application policy.

Additionally or alternatively, the policy-based manager 110 of processing platform 106 in illustrative embodiments is configured for distributed policy definition, enforcement and monitoring of real-time IT infrastructure configurations within the infrastructure abstraction layers of the multi-layer infrastructure 112. Such arrangements can provide considerable advantages over conventional policy management arrangements.

For example, illustrative embodiments overcome the following significant problems that can arise in conventional practice:

1. In a data center environment, there may be multiple people or groups responsible for the operations of the IT infrastructure. Insufficient access controls may enable a user to alter infrastructure configuration and policy beyond the user's area of expertise and responsibility in either an intentional or unintentional fashion. This can increase exposure to sub-optimal or risky infrastructure configurations.

2. In a data center environment, the IT infrastructure is often heterogeneous in nature. Infrastructure type and/or vendor specific approaches to infrastructure inventory allocation, policy enforcement, orchestration and monitoring can lead to isolated pools of infrastructure, management overhead, sub-optimal utilization and inconsistent policy enforcement across infrastructure silos.

3. Complex monolithic policy definition where the policy rules are defined as discrete parameters and then enforced using a single control point which is tightly coupled to both the policy syntax and the underlying infrastructure. This can be overly prescriptive and results in limited flexibility in the ability to distribute and adapt policy enforcement based on the real-time configuration of the underlying available infrastructure.

4. An inability to fulfill and enforce policy across a heterogeneous infrastructure in an effective and efficient fashion.

In some embodiments, the policy-based manager 110 is configured to manage real-time configurations of the multi-layer infrastructure 112 through a continuous integration of hierarchical polices where each policy's ownership, maintenance and monitoring can be distributed to appropriate business functions. Such policy-based infrastructure management includes high-level functions, interfaces, hierarchy and policy structures, but leaves the implementation of internal structure and technology choice to the specific implementation.

Illustrative embodiments provide clear definition of roles and responsibilities related to the multi-layer infrastructure 112.

As noted above, in a data center environment, there may be multiple people or groups responsible for the operations of the multi-layer infrastructure 112. The policy-based manager 110 is therefore configured to enable the definition of the operational roles and responsibilities related to the multi-layer infrastructure 112. When defining a role, the role is given a title and each role is given write access to the infrastructure policy it is responsible for. As each organization is different, a given such organization may be permitted to define roles that meet its organizational structure. Individuals or groups are then assigned roles or multiple roles. In addition, as the multi-layer infrastructure 112 comprises a hierarchical arrangement of layers, the roles can be defined such that the operational policy for each layer can be maintained independent of the operational policy of the other layers. With these roles and responsibilities in place, specific people or groups now have the access rights to define operational policy for the specific areas of the infrastructure they are responsible for and prevented from defining policy for areas outside their domain of responsibility.

Furthermore, illustrative embodiments are configured to provide interpretation and translation of policy rules into infrastructure inventory configuration, orchestration and monitoring across heterogeneous infrastructure.

For example, the interpretation and translation of policy rules into infrastructure inventory configuration, orchestration and monitoring can be implemented at least in part via the controllers 124 of the policy-based manager 110. The policy-based manager 110 illustratively comprises one or more controllers 124 for each of at least a subset of the layers of the multi-layer infrastructure 112. The particular number and type of controllers 124 can vary depending upon factors such as the topology of the multi-layer infrastructure 112.

A given one of the controllers 124 is illustratively configured to register the infrastructure inventory it has available and to receive application and operational policy via interfaces of the type previously described. The given controller translates policy into M&O related actions to manage, monitor and provision infrastructure in order to enforce the policy.

In some embodiments, each of the controllers 124 is illustratively configured to enforce policy in a closed loop fashion as follows:

1. The current policy represents the desired state of the infrastructure assets owned by the controller.
2. The controller then determines the current state of the infrastructure by continuously monitoring the infrastructure.
3. If at any point there is a difference between the desired state and the current state, the controller will trigger M&O related actions on the infrastructure in order to reach the desired state.

In a heterogeneous environment, the policy may be defined in a standard fashion and the controller then translates the policy into specific M&O actions related to the infrastructure in question.

In addition, illustrative embodiments can provide distributed policy definition and enforcement through continuous integration of hierarchical polices.

For example, in order to simplify policy definition, the policy may be abstracted via the hierarchical layers of the multi-layer infrastructure 112 in the manner previously described. To effectively distribute policy across the multiple hierarchical layers, that policy is ingested and distributed in a clearly defined manner.

To enable policy distribution and enforcement, each of at least a subset of the layers of the multi-layer infrastructure 112 may have the ability to ingest and distribute policy through a corresponding one of the policy orchestrators 122. As described previously, a given one of the orchestrators 122 corresponding to a particular one of the layers of the multi-layer infrastructure 112 has the capability to ingest policy rules and to enforce policy at that specific layer and/or to distribute policy to another layer in the hierarchy. When enforcing policy, the policy is sent to one or more controllers 124 at a specific layer and the controller will enforce the policy as described previously. When distributing policy, a given one of the orchestrators 122 at a particular one of the layers may use templates and/or profiles to translate policy into primitives relevant to the next layer in the hierarchy and then send the translated policy to one or more other ones of the orchestrators 122 at that next layer.

Illustrative embodiments also provide collective policy enforcement and fulfillment across heterogeneous infrastructure through continuous integration of hierarchical layers.

As described above, operational policy defines the operational rules and requirements related to the multi-layer infrastructure 112, and application policy defines the operating rules and requirements of an application running on the multi-layer infrastructure 112. In order to effectively enforce and fulfill policy, multiple control points operate together to enforce and fulfill the policy. For example, when an operational policy is defined, it is then ingested at the specific layer the operational policy relates to through a corresponding one of the orchestrators 122. When an application policy is defined, it is ingested at the uppermost layer of the infrastructure hierarchy through a corresponding one of the orchestrators 122 with other ones of the orchestrators 122 at different ones of the layers distributing policy to the next layer in the hierarchy as needed. The policy therefore travels down through multiple layer until it is fulfilled or options are presented, and once fulfilled one or more of the controllers 124 responsible for the corresponding inventory enforces the policy through M&O actions and monitoring. The orchestrators 122 reconcile or combine operational and application policy at each layer in order to enable collective enforcement and fulfillment across multiple control points.

In some embodiments, the policy-based manager 110 utilizes RBAC to manage policy access and definition. The integration of role-based access and policy definition in a clear systematic and granular fashion provides additional advantages within the context of policy-based infrastructure management at least in part by enabling each responsible organization to organize operational policy for the multi-layer infrastructure as it sees fit. For example, one organization may organize based on subject matter experts, with a storage team responsible for storage policy, a compute team responsible for compute policy and a network team responsible for network policy, while another organization could organize in a generalist fashion with one team responsible for all operational policy.

The use of controllers 124 to interpret standard policy and translate it into specific M&O related actions advantageously enables policy enforcement cross heterogeneous infrastructure boundaries. For example, this can enable the same policy to be used on infrastructure from different vendors, products lines and product variants.

Also, the use of orchestrators 122 to distribute and enforce policy in a hierarchical distributed self-organizing fashion greatly simplifies policy definition and enforcement over conventional arrangements. For example, a user can easily define a few lines of high-level policy which are then translated and enforced as granular policy rules. This enables a user to define in policy an application execution venue and this would be translated into one or more policy rules relating to the lower level infrastructure components which constitute the execution venue.

The collective policy enforcement and fulfillment using orchestrators 122 and controllers 124 of the policy-based manager 110 provides a particularly efficient mechanism for distribution and enforcement of policy across heterogeneous infrastructure. For example, such arrangements enable a modular approach to separating and recombining infrastructure to meet policy rules. A disaggregated set of hardware components could be composed and partitioned in a dynamic fashion to meet real-time policy rules and separated and recombined over time in an autonomous fashion as operational and application policies evolve.

The particular policy-based manager components, infrastructure layers, process operations and other functionality described in conjunction with the diagrams of FIGS. 1 through 20 are presented by way of illustrative example only, and should not be construed as limiting the scope of the invention in any way. Alternative embodiments can use other types and arrangements of components to implement a policy-based manager and associated multi-layer infrastructure. For example, additional or alternative policy-based manager components and infrastructure layers can be used in other embodiments.

It is also to be appreciated that policy-based infrastructure management functionality such as that described in conjunction with the diagrams of FIGS. 1 through 20 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

As mentioned previously, at least portions of the information processing system 100 may be implemented using one or more processing platforms. Illustrative embodiments of such platforms will now be described in greater detail. Although described in the context of system 100, these platforms may also be used to implement at least portions of other information processing systems in other embodiments of the invention.

Figure 21:
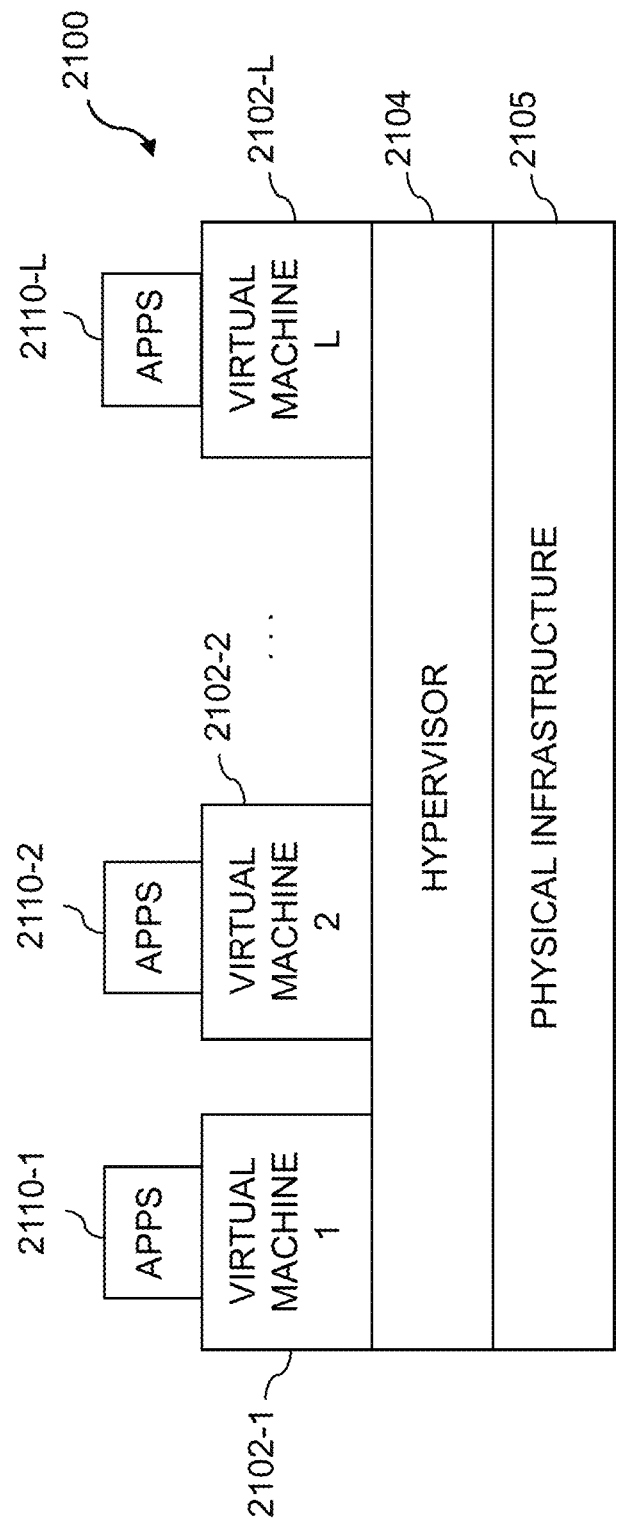
FIGS. 21 and 22 show examples of processing platforms that may be utilized to implement at least a portion of the information processing system of FIG. 1.

FIG. 21 shows an example processing platform comprising cloud infrastructure 2100. The cloud infrastructure 2100 comprises a combination of physical and virtual processing resources that may be utilized to implement at least a portion of the information processing system 100. The cloud infrastructure 2100 comprises virtual machines (VMs) 2102-1, 2102-2, . . . 2102-L implemented using a hypervisor 2104. The hypervisor 2104 runs on physical infrastructure 2105. The cloud infrastructure 2100 further comprises sets of applications 2110-1, 2110-2, . . . 2110-L running on respective ones of the virtual machines 2102-1, 2102-2, . . . 2102-L under the control of the hypervisor 2104.

Although only a single hypervisor 2104 is shown in the embodiment of FIG. 21, the information processing system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 2104 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include one or more storage systems.

Such storage systems can comprise any of a variety of different types of storage including network-attached storage (NAS), storage area networks (SANs), direct-attached storage (DAS) and distributed DAS, as well as combinations of these and other storage types, including software-defined storage.

Illustrative embodiments can therefore implement storage systems utilizing storage virtualization or software-defined storage, possibly implemented using ScaleIO™ or VMware® vSAN.

Virtualization can be similarly provided for network resources of the information processing system 100 through network virtualization or software-defined networking, possibly implemented using VMware® NSX®.

Particular types of storage products that can be used in implementing a given storage system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from Dell EMC. Combinations of multiple ones of these and other storage products can also be used in implementing a given storage system in an illustrative embodiment.

One or more of the processing modules or other components of system 100 may therefore each run on a computer, server, storage device or other processing platform element. A given such element may be viewed as an example of what is more generally referred to herein as a "processing device." The cloud infrastructure 2100 shown in FIG. 21 may represent at least a portion of one processing platform.

As mentioned previously, cloud infrastructure as disclosed herein can include cloud-based systems such as Pivotal Cloud Foundry. Virtual machines provided in such systems can be used to implement at least portions of the policy-based manager 110 and the multi-layer infrastructure 112 of system 100.

Figure 22:
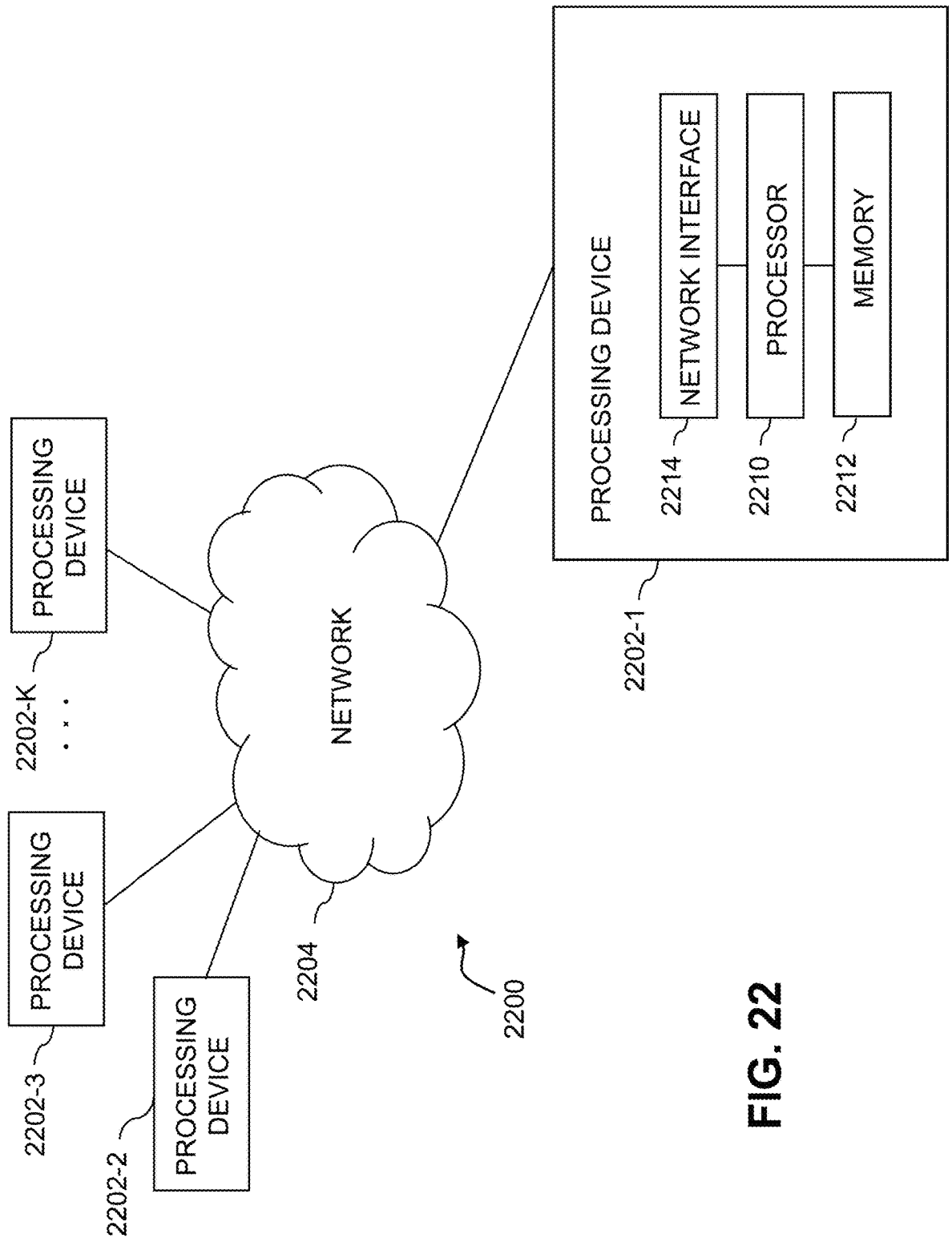

Another example of a processing platform is processing platform 2200 shown in FIG. 22. The processing platform 2200 in this embodiment comprises a portion of system 100 and includes a plurality of processing devices, denoted 2202-1, 2202-2, 2202-3, . . . 2202-K, which communicate with one another over a network 2204.

The network 2204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 2202-1 in the processing platform 2200 comprises a processor 2210 coupled to a memory 2212.

The processor 2210 may comprise a microprocessor, a microcontroller, an ASIC, a field-programmable gate array (FPGA) or other type of processing circuitry, as well as portions or combinations of such circuitry elements.

The memory 2212 may comprise random access memory (RAM), read-only memory (ROM) or other types of memory, in any combination. The memory 2212 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 2202-1 is network interface circuitry 2214, which is used to interface the processing device with the network 2204 and other system components, and may comprise conventional transceivers.

The other processing devices 2202 of the processing platform 2200 are assumed to be configured in a manner similar to that shown for processing device 2202-1 in the figure.

Again, the particular processing platform 2200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure, in place of or in addition to virtualization infrastructure comprising virtual machines. Such virtualization infrastructure illustratively includes container-based virtualization infrastructure configured to provide the above-noted Docker containers or other types of LXCs.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

It should again be emphasized that the above-described embodiments of the invention are presented for purposes of illustration only. Many variations and other alternative embodiments may be used. For example, the disclosed techniques are applicable to a wide variety of other types of information processing systems in which it is desirable to provide efficient management of operational and application policies in hybrid multi-tenant clouds and other types of cloud-based information processing systems. Also, the particular configurations of system components shown in the figures can be varied in other embodiments. Thus, for example, the particular types of processing platforms, policy-based managers, multi-layer infrastructure architectures, policy ingestion modules, orchestrators, controllers, management and orchestration modules, and other components deployed in a given embodiment and their respective configurations may be varied. Moreover, the various assumptions made above in the course of describing the illustrative embodiments should also be viewed as examples rather than as requirements or limitations of the invention. Numerous other alternative embodiments within the scope of the appended claims will be readily apparent to those skilled in the art.

What is claimed is:

1. An apparatus comprising:
   a processing platform comprising a plurality of processing devices each comprising a processor coupled to a memory;
   the processing platform being configured to implement multi-layer infrastructure comprising compute, storage and network resources at a relatively low level of the multi-layer infrastructure, an application layer at a relatively high level of the multi-layer infrastructure, and one or more additional layers arranged between the relatively low level and the relatively high level;
   the processing platform being further configured:
   to determine policies for respective different ones of the layers of the multi-layer infrastructure, the policy for a given one of the layers defining rules and requirements relating to that layer;
   to enforce the policies at the respective layers of the multi-layer infrastructure; and
   to monitor performance of an application executing in the multi-layer infrastructure;
   wherein determining policies for respective ones of the layers of the multi-layer infrastructure comprises:
      determining operational policies for each of a plurality of layers other than the application layer;
      determining an application policy for the application layer;
      propagating the application policy from the application layer through the other layers of the multi-layer infrastructure; and
      generating the policy for the given one of the layers as a combination of the application policy and an operational policy for that layer;
   wherein one or more configuration parameters of the multi-layer infrastructure are adjusted based at least in part on a result of the monitoring; and
   wherein each of one or more of the layers of the multi-layer infrastructure is associated with at least one controller configured to receive the policy for the corresponding layer and to translate the policy into management and orchestration actions for that layer.

2. The apparatus of claim 1 wherein the relatively low level of the multi-layer infrastructure comprising the compute, storage and network resources comprises a lowest level of the multi-layer infrastructure.

3. The apparatus of claim 1 wherein the additional layers of the multi-layer infrastructure comprise at least a subset of:
   an execution venue layer;
   a software-defined infrastructure layer;
   a node partition layer; and
   a node composer layer.

4. The apparatus of claim 1 wherein each of one or more of the layers of the multi-layer infrastructure is associated with at least one orchestrator configured to receive an application policy from an overlying layer and to provide the application policy to an underlying layer.

5. The apparatus of claim 4 wherein a given one of the orchestrators is configured to generate the policy for its corresponding layer as a function of an operational policy for that layer and the application policy.

6. The apparatus of claim 1 wherein a given one of the controllers is configured to register infrastructure inventory of the corresponding layer to one or more orchestrators associated with that layer.

7. The apparatus of claim 1 wherein a given one of the controllers is configured to enforce the policy for the corresponding layer at least in part by identifying a deviation of a current state of designated infrastructure assets of that layer from a desired state of the designated infrastructure assets of that layer and generating one or more additional management and orchestration actions for that layer responsive to the identified deviation.

8. The apparatus of claim 1 wherein the processing platform is further configured to implement role-based access control for controlling access to operational policy definition functionality for respective ones of the layers of the multi-layer infrastructure so as to permit only entities having particular roles to define operational policies for at least portions of different ones of the layers.

9. The apparatus of claim 1 wherein different operational policies are ingested at respective different ones of the layers of the multi-layer infrastructure other than the application layer and wherein an application policy is ingested at the application layer of the multi-layer infrastructure.

10. The apparatus of claim 9 wherein mutual enforcement of the operational and application policies is achieved in the multi-layer infrastructure by combining operational and application policies at respective policy control points of respective ones of the layers other than the application layer.

11. The apparatus of claim 10 wherein combining operational and application policies at one of the policy control points of a given one of the layers comprises combining an operational policy ingested by the given layer with an application policy received by the given layer from an overlying layer to produce a combined policy for the given layer.

12. The apparatus of claim 1 wherein enforcing the policy for a given one of the layers of the multi-layer infrastructure comprises converting the policy in a controller of the given layer into one or more infrastructure-specific management and orchestration actions to be carried out in the given layer.

13. A method comprising:
   implementing multi-layer infrastructure comprising compute, storage and network resources at a relatively low level of the multi-layer infrastructure, an application layer at a relatively high level of the multi-layer infrastructure, and one or more additional layers arranged between the relatively low level and the relatively high level;
   determining policies for respective different ones of the layers of the multi-layer infrastructure, the policy for a given one of the layers defining rules and requirements relating to that layer;
   enforcing the policies at the respective layers of the multi-layer infrastructure; and
   monitoring performance of an application executing in the multi-layer infrastructure;
   wherein determining policies for respective ones of the layers of the multi-layer infrastructure comprises:
      determining operational policies for each of a plurality of layers other than the application layer;
      determining an application policy for the application layer;
      propagating the application policy from the application layer through the other layers of the multi-layer infrastructure; and
      generating the policy for the given one of the layers as a combination of the application policy and an operational policy for that layer;
   wherein one or more configuration parameters of the multi-layer infrastructure are adjusted based at least in part on a result of the monitoring;
   wherein each of one or more of the layers of the multi-layer infrastructure is associated with at least one controller configured to receive the policy for the corresponding layer and to translate the policy into management and orchestration actions for that layer; and
   wherein the method is performed in at least one processing platform comprising a plurality of processing devices each comprising a processor coupled to a memory.

14. The method of claim 13 wherein each of one or more of the layers of the multi-layer infrastructure is associated with at least one orchestrator configured to receive an application policy from an overlying layer and to provide the application policy to an underlying layer, and wherein a given one of the orchestrators is configured to generate the policy for its corresponding layer as a function of an operational policy for that layer and the application policy.

15. The method of claim 13 wherein a given one of the controllers is configured to register infrastructure inventory of the corresponding layer to one or more orchestrators associated with that layer.

16. A computer program product comprising a non-transitory processor-readable storage medium having stored therein program code of one or more software programs, wherein the program code when executed by at least one processing platform comprising a plurality of processing devices causes the processing platform:
   to implement multi-layer infrastructure comprising compute, storage and network resources at a relatively low level of the multi-layer infrastructure, an application layer at a relatively high level of the multi-layer infrastructure, and one or more additional layers arranged between the relatively low level and the relatively high level;
   to determine policies for respective different ones of the layers of the multi-layer infrastructure, the policy for a given one of the layers defining rules and requirements relating to that layer;
   to enforce the policies at the respective layers of the multi-layer infrastructure; and
   to monitor performance of an application executing in the multi-layer infrastructure;
   wherein determining policies for respective ones of the layers of the multi-layer infrastructure comprises:
      determining operational policies for each of a plurality of layers other than the application layer;
      determining an application policy for the application layer;
      propagating the application policy from the application layer through the other layers of the multi-layer infrastructure; and
      generating the policy for the given one of the layers as a combination of the application policy and an operational policy for that layer;
   wherein one or more configuration parameters of the multi-layer infrastructure are adjusted based at least in part on a result of the monitoring; and
   wherein each of one or more of the layers of the multi-layer infrastructure is associated with at least one controller configured to receive the policy for the corresponding layer and to translate the policy into management and orchestration actions for that layer.

17. The computer program product of claim 16 wherein each of one or more of the layers of the multi-layer infrastructure is associated with at least one orchestrator configured to receive an application policy from an overlying layer and to provide the application policy to an underlying layer, and wherein a given one of the orchestrators is configured to generate the policy for its corresponding layer as a function of an operational policy for that layer and the application policy.

18. The computer program product of claim 16 wherein a given one of the controllers is configured to register infrastructure inventory of the corresponding layer to one or more orchestrators associated with that layer.

19. The computer program product of claim 16 wherein the additional layers of the multi-layer infrastructure comprise at least a subset of:

an execution venue layer;

a software-defined infrastructure layer;

a node partition layer; and a node composer layer.

20. The computer program product of claim 16 wherein a given one of the controllers is configured to enforce the policy for the corresponding layer at least in part by identifying a deviation of a current state of designated infrastructure assets of that layer from a desired state of the designated infrastructure assets of that layer and generating one or more additional management and orchestration actions for that layer responsive to the identified deviation.

\* \* \* \* \*